(12) United States Patent
Kido et al.

(10) Patent No.: US 6,716,917 B2
(45) Date of Patent: Apr. 6, 2004

(54) RUBBER-REINFORCED STYRENE TRANSPARENT RESIN COMPOSITION AND METHOD OF PRODUCING THE SAME

(75) Inventors: Ryota Kido, Ichihara (JP); Hiroshi Shibata, Ichihara (JP); Hajime Takamura, Ichihara (JP); Akihiro Ohmura, Nishitokyo (JP); Yoshiyuki Yamamoto, Suzuka (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 09/912,407

(22) Filed: Jul. 26, 2001

(65) Prior Publication Data

US 2002/0042476 A1 Apr. 11, 2002

(30) Foreign Application Priority Data

Jul. 26, 2000 (JP) ........................................ 2000-225142

(51) Int. Cl.⁷ ........................ C08L 33/06; C08L 25/14; C08L 51/04
(52) U.S. Cl. .......................... 525/78; 525/80; 525/83; 525/84; 525/85; 525/86; 525/87
(58) Field of Search ............................. 525/78, 80, 83, 525/84, 85, 86, 87

(56) References Cited

U.S. PATENT DOCUMENTS

| | | | |
|---|---|---|---|
| 3,524,536 A | 8/1970 | Terenzi et al. | 206/45.31 |
| 3,843,753 A | * 10/1974 | Owens | |
| 4,160,001 A | 7/1979 | Rosen | 525/230 |
| 6,121,385 A | 9/2000 | Shichijo et al. | 525/227 |

FOREIGN PATENT DOCUMENTS

| | | |
|---|---|---|
| BE | 683 891 A | 1/1967 |
| EP | 0 173 812 A1 | 3/1986 |
| EP | 0 613 925 A1 | 9/1994 |
| EP | 0 741 165 A1 | 11/1996 |
| FR | 1 552 314 A | 1/1969 |
| FR | 2 561 248 A1 | 9/1985 |
| GB | 2 106 120 A | 4/1983 |
| GB | 2 159 162 A | 11/1985 |
| JP | 60-120734 A | 6/1985 |
| JP | 61-043643 A | 3/1986 |
| JP | 62-164745 A | 7/1987 |
| JP | 3-113715 A | 5/1991 |
| JP | 4-126756 A | 4/1992 |
| JP | 4-258619 A | 9/1992 |
| JP | 4-320441 | 11/1992 |
| JP | 5-78428 A | 3/1993 |
| JP | 7-292205 A | 11/1995 |
| JP | 8-134298 A | 5/1996 |
| JP | 2000-178405 A | 6/2000 |

OTHER PUBLICATIONS esp@cenet—Document Bibliography, Patent No. JP4008754, Publication Date Jan. 13, 1992.

* cited by examiner

*Primary Examiner*—Jeffrey Mullis
(74) *Attorney, Agent, or Firm*—Kubovcik & Kubovcik

(57) ABSTRACT

A rubber-reinforced styrene transparent resin composition contains a styrene copolymer reinforced with a rubber polymer, wherein the monomer composition of an acetone soluble resin component contained in the resin composition contains 5 to 70% by weight of aromatic vinyl monomer (a1), 30 to 95% by weight of unsaturated carboxylic acid alkyl ester monomer (a2), 0 to 50% by weight of vinyl cyanide monomer (a3), and 0 to 50% by weight of another monomer copolymerizable with these monomers, and the acid value of the acetone soluble resin component is 0.01 to 1 mgKOH/g.

13 Claims, 4 Drawing Sheets

RUBBER-REINFORCED STYRENE TRANSPARENT RESIN COMPOSITION AND METHOD OF PRODUCING THE SAME

BACKGROUND OF THE INVENTION

1. Field of the Invention

The present invention relates to a rubber-reinforced styrene transparent resin composition having well-balanced and excellent transparency, color tone, impact resistance, stiffness, and chemical resistance. The present invention also relates to a method of efficiently producing the resin composition.

2. Description of the Related Art

Rubber-reinforced styrene transparent thermoplastic resins using rubber-containing graft copolymers, which are obtained by graft-copolymerizing a vinyl monomer with a rubber polymer such as diene rubber or the like, have excellent impact resistance, moldability, appearance, etc., and are thus widely used for various applications such as OA equipment, household electrical goods, general merchandise, etc. Examples of the vinyl monomer include aromatic vinyl compounds such as styrene, α-methyl styrene, and the like; unsaturated carboxylic acid esters such as methyl methacrylate and the like; vinyl cyanides such as acrylonitrile, methacrylonitrile, and the like.

In recent years, the rubber-reinforced styrene transparent thermoplastic resins have been increasingly requested to have an improved physical property balance between impact resistance and stiffness while maintaining excellent transparency and color tone, and many attempts have been made so far. However, in the present situation, a satisfactory level is not yet achieved.

For example, Japanese Unexamined Patent Publication Nos. 60-120734, 61-43643, 62-164745 and 4-320441 disclose methods for improving physical properties such as impact resistant, etc. by copolymerizing an acid component such as methacrylic acid or the like with a matrix resin. However, the resultant resin compositions have the problems of poor transparency and color tone because the amount of an acid component is excessively large.

Also, Japanese Unexamined Patent Publication Nos. 7-292205 and 8-134298 disclose that a graft copolymer is added to a melted matrix resin obtained by continuous bulk polymerization to produce an ABS resin having an excellent color tone and an excellent physical property balance between impact resistance and stiffness. However, these publications do not disclose application to high-transparency resin compositions, and in application of the method proposed in the publications to the high-transparency resin compositions, the effect on the color tone and the physical property balance between impact resistance and stiffness is not yet satisfactory.

In the present situation, application of such a transparent ABS resin is restricted due to the low resistance to chemicals such as an organic solvent, and solvents such as a detergent, and the like.

As a means for improving the chemical resistance of a general ABS resin without transparency, it is generally known to increase the content of a vinyl cyanide compound, and various so-called highly nitrile-containing thermoplastic resin compositions are proposed.

Resin compositions generally known from the viewpoint of improvement in chemical resistance include resin compositions (Japanese Unexamined Patent Publication Nos. 4-258619 and 5-78428) in which the graft ratio of a graft copolymer is defined, highly nitrile-containing thermoplastic resin compositions (Japanese Unexamined Patent Publication No. 4-126756) in which a matrix component comprises a methacrylate ester as an essential component, and the like.

However, the above-described conventional highly nitrile-containing thermoplastic resin compositions have different rates of reaction between an aromatic vinyl compound and a vinyl cyanide compound, thereby causing difficulties in obtaining polymers having a homogeneous composition. Therefore, the thermoplastic resin compositions each comprising a copolymer composed of an aromatic vinyl compound and a vinyl cyanide compound are easily yellowed during molding to cause the problem of deteriorating quality due to discoloration.

In this way, the technique of improving chemical resistance by increasing the nitrile content easily causes the problem of discoloration and deterioration in transparency due to an increase in the nitrile content. Therefore, application of the technique of increasing the nitrile content to transparent ABS is conventionally thought to cause fatal defects in transparent resin products.

Therefore, the highly nitrile-containing thermoplastic resin compositions having excellent and balanced transparency, chemical resistance and color stability have not yet been obtained.

A known method of producing a thermoplastic resin composition represented by an ABS resin, which is obtained by mixing a vinyl copolymer and a graft copolymer, comprises polymerizing a vinyl monomer to produce each of the vinyl copolymer and the graft copolymer, and then mixing both polymers by heat melting. An example of the mixing method comprises mixing the vinyl copolymer and the graft copolymer and then melting the mixture by using the melt blending apparatus shown in FIG. 3.

FIG. 3 is a schematic longitudinal sectional view showing an example of a melting twin-screw blending apparatus for blending the vinyl copolymer and the graft copolymer. In this apparatus, the vinyl copolymer and the graft copolymer are quantitatively supplied to a blending hopper 9 through a feed hoppers 7 and 8, respectively. A resin powder obtained by blending in the blending hopper 9 is supplied to a melt blending apparatus 10 at a constant rate, and kneaded and transferred under heat-melting in a system which is heated to a predetermined temperature (230° C. or more) required for melt blending. After the elapse of a predetermined time, the product is discharged from a discharge port 6 at a constant rate.

In the apparatus, from the viewpoint of temperature and time, the vinyl copolymer and the graft copolymer receive the same thermal history, and thus excessive thermal history is applied to the graft copolymer to cause the fault that the color deteriorates.

On the other hand, some methods are proposed to decrease the thermal history, in which a graft copolymer is continuously added to and mixed with an as-polymerized copolymer (A) in a melt state to produce a thermoplastic resin composition in a process of producing a vinyl copolymer by continuous bulk polymerization (for example, Japanese Unexamined Patent Publication Nos. 7-292205 and 8-134298).

However, a balance between a color tone and impact resistance is not easily obtained only by the method disclosed in these publications, and further improvement is desired earnestly for stably producing a resin composition having excellent total quality.

Furthermore, some methods are proposed for improving the balance between a color tone, impact resistance, stiffness, etc. and productivity of a rubber reinforced thermoplastic resin, and improving the transparency of a rubber reinforced thermoplastic resin having transparency, in which a highly rubber-containing polymer is added to and mixed with a melted copolymer in a continuous bulk polymerization or continuous solution polymerization process (Patent Application No. 3109378, Japanese Unexamined Patent Publication No. 2000-178405).

This method can improve dispersibility of the highly rubber-containing polymer in the rubber-reinforced thermoplastic resin. However, particularly in production of a low-viscosity type having low shear force in a melt kneading zone in an extruder, the appearance is defective due to poor dispersibility of the highly rubber-containing polymer, and the physical property balance between impact resistance, stiffness, etc. is slightly insufficient in some cases.

Therefore, a rubber-reinforced thermoplastic resin having an excellent balance between appearance, color tone, impact resistance, stiffness, etc., and excellent transparency has not yet been obtained.

SUMMARY OF THE INVENTION

An object of the present invention is to resolve the disadvantages of the conventional techniques and provide a rubber-reinforced styrene resin composition having well-balanced and excellent transparency, color tone, impact resistance, stiffness and chemical resistance, and a method of efficiently producing the same.

The present invention provides a rubber-reinforced styrene transparent resin composition comprising a styrene copolymer reinforced with a rubber polymer, wherein the monomer composition of an acetone soluble resin component contained in the resin composition comprises 5 to 70% by weight of aromatic vinyl monomer (a1), 30 to 95% by weight of unsaturated carboxylic acid alkyl ester monomer (a2), 0 to 50% by weight of vinyl cyanide monomer (a3), and 0 to 50% by weight of another monomer copolymerizable with these monomers, and the acid value of the acetone soluble resin component is 0.01 to 1 mgKOH/g.

REFERENCE NUMERALS

Figure 1:
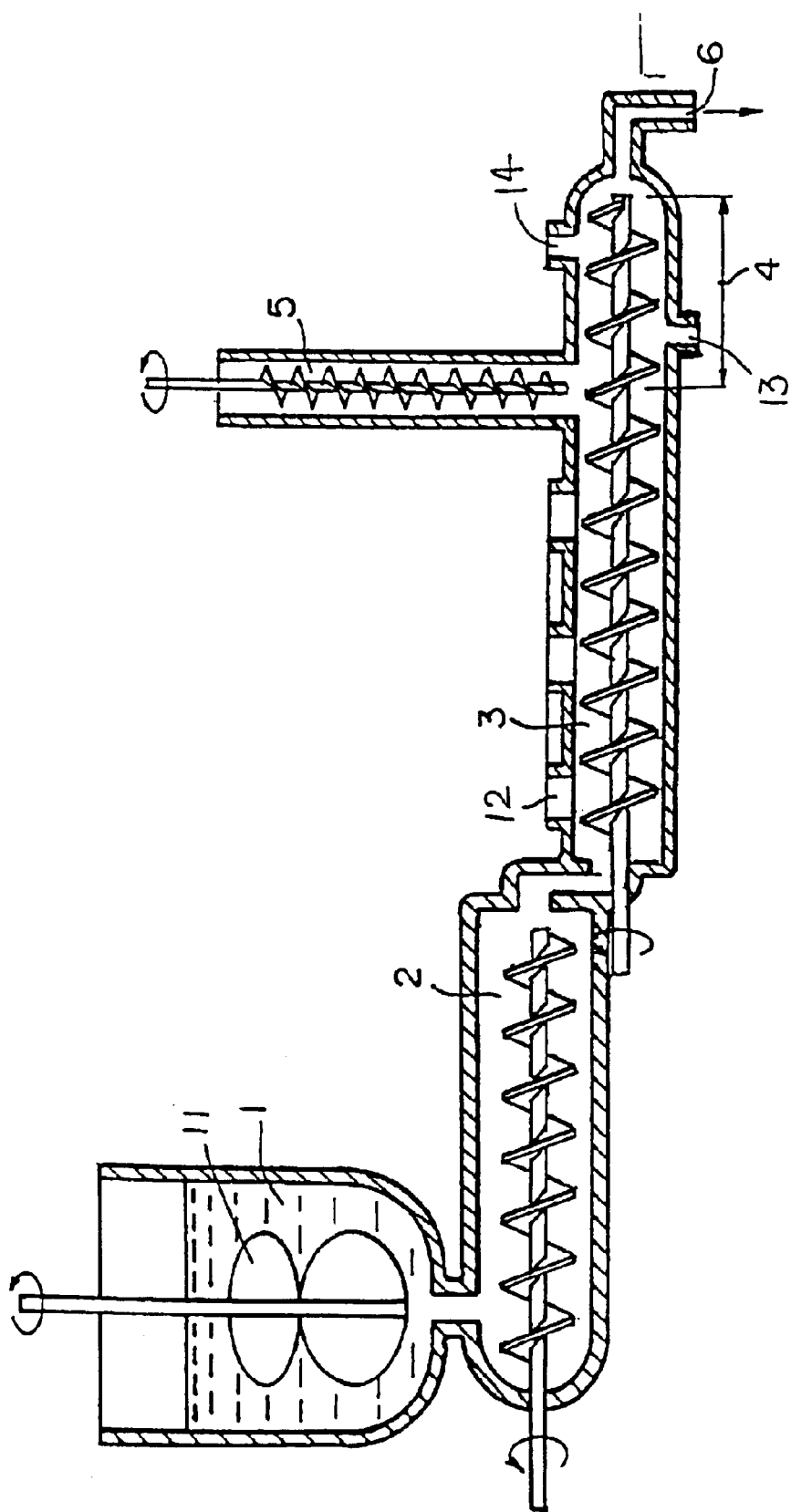
FIG. 1 is a schematic longitudinal sectional view showing an apparatus for carrying out a method of the present invention according to an embodiment of the present invention.

1: reactor
2: preheater
3: monomer remover
4: melt blending portion
5: feeder
6: discharge port
7, 8: feed hopper
9: blending hopper
10: melt blending apparatus
11: helical ribbon wing
12: vent port
13: water inlet
14: vent port
15, 15': screw
16: inner wall of the barrel
17: actual volume space in the apparatus
18: 1/4 elliptical tool
19: test piece
20: chemical coated surface
21: crack

DESCRIPTION OF THE PREFERRED EMBODIMENTS

The term "rubber polymer" represents a rubber-like polymer represented by diene rubber, and it will be described in detail below. The term "styrene copolymer" means a copolymer obtained by copolymerizing styrene or a derivative thereof with another copolymerizable component. An example of the styrene derivative and other copolymerizable component is a vinyl monomer mixture containing an aromatic vinyl monomer such as α-methyl styrene, or the like; an unsaturated carboxylic acid ester monomer such as methyl methacrylate, or the like; a vinyl cyanide monomer such as acrylonitrile, methacrylonitrile, or the like. The above-described monomers are copolymerized with the rubber polymer to obtain a resin composition provided with impact resistance. The resin composition of the present invention is required to have high transparency, and preferably has a total light transmittance of 50% or more, which is measured by the measurement method described below. Namely, a so-called transparent MBS resin or transparent ABS resin is preferably used. Particularly, the resin composition preferably comprises 10 to 95 parts by weight of copolymer (A) obtained by copolymerizing a vinyl monomer mixture (a), and 90 to 5 parts by weight of graft copolymer (B) obtained by graft-polymerizing a vinyl monomer mixture (c) in the presence of a rubber polymer (b). Each of the vinyl monomer mixtures (a) and (c) is preferably a monomer mixture containing 5 to 70% by weight of aromatic vinyl monomer (a1), 30 to 95% by weight of unsaturated carboxylic acid alkyl ester monomer (a2), 0 to 50% by weight of vinyl cyanide monomer (a3) and 0 to 50% by weight of another monomer (a4) copolymerizable with these monomers, and containing substantially no unsaturated carboxylic acid monomer (except the unsaturated carboxylic acid alkyl ester monomer (a2)) (a5).

In the present invention, it is important that the acetone soluble resin component contained in the resin composition comprises the monomer composition containing 5 to 70% by weight of aromatic vinyl monomer (a1), 30 to 95% by weight of unsaturated carboxylic acid alkyl ester monomer (a2), 0 to 50% by weight of vinyl cyanide monomer (a3), and 0 to 50% by weight of another monomer (a4) copolymerizable with these monomers, and that the acid value of the acetone soluble resin component is 0.01 to 1 mgKOH/g.

Furthermore, in the composition distribution of weight ratios ($\phi_{ST}/\phi_{MMA}$) of the aromatic vinyl monomer (a1) to the unsaturated carboxylic acid alkyl ester monomer (a2) in the monomer composition which constitutes the acetone soluble resin component, 80% by weight or more of the acetone soluble resin component preferably lies in the range of 0.75 to 1.2 times as large as the average weight ratio ($\phi_{ST}/\phi_{MMA}$) in order to suppress deterioration of the transparency of the resin composition when the resin composition contains an acid component produced by hydrolysis of the unsaturated carboxylic acid alkyl ester monomer (a2). Also, more preferably 90% by weight or more, and most preferably 95% by weight or more, of the acetone soluble resin component lies in the range of 0.75 to 1.2 times as large as the average value.

In order to obtain the resin composition having well-balanced and excellent transparency, color tone, impact resistance, etc., the monomer composition of the acetone soluble resin component preferably lies in the above range.

The content of the aromatic vinyl monomer (a1) contained in the monomer composition of the acetone soluble resin component is 5 to 70% by weight. With a content of less than 5% by weight, the resultant resin composition exhibits poor impact resistance, while with a content of over 70% by weight, the transparency deteriorates. From the viewpoint of impact resistance and transparency, the content is preferably 9 to 50% by weight, and more preferably 14 to 35% by weight.

The amount of the unsaturated carboxylic acid alkyl ester monomer (a2) of the acetone soluble resin component is 30 to 95% by weight of the total monomer composition thereof. With an amount of less than 30% by weight, the resultant resin composition exhibits poor transparency, while with an amount of over 95% by weight, the impact resistance deteriorates. From the viewpoint of impact resistance and transparency, the amount is preferably 35 to 90% by weight, and more preferably 40 to 85% by weight.

The amount of the vinyl cyanide monomer (a3) of the acetone soluble resin component is 0 to 50% by weight of the total monomer composition thereof. With an amount of over 50% by weight, the color tone deteriorates. From the viewpoint of color tone and impact resistance, the amount is preferably 0.1 to 45% by weight, and more preferably 1 to 40% by weight.

The amount of the other monomer (a4) copolymerizable with the above monomers is 0 to 50% by weight. With an amount of over 50% by weight, the object of the present invention cannot be achieved.

In order to obtain well-balanced and excellent transparency, color tone, impact resistance and chemical resistance, the monomer composition of the acetone soluble resin component preferably comprises 5 to 40% by weight of aromatic vinyl monomer (a1), 30 to 85% by weight of unsaturated carboxylic acid alkyl ester monomer (a2), 10 to 50% by weight of vinyl cyanide monomer (a3), and 10 to 50% by weight of another monomer (a4) copolymerizable with these monomers. The monomer composition more preferably comprises 9 to 40% by weight of aromatic vinyl monomer (a1), 35 to 85% by weight of unsaturated carboxylic acid alkyl ester monomer (a2), 10 to 45% by weight of vinyl cyanide monomer (a3), and 0 to 40% by weight of another monomer (a4) copolymerizable with these monomers. The monomer composition most preferably comprises 14 to 35% by weight of aromatic vinyl monomer (a1), 40 to 75% by weight of unsaturated carboxylic acid alkyl ester monomer (a2), 10 to 40% by weight of vinyl cyanide monomer (a3), and 0 to 40% by weight of another monomer (a4) copolymerizable with these monomers.

The composition of the acetone soluble resin component may be determined by the following peaks appearing in a FT-IR chart.

Aromatic vinyl monomer (a1): Peak at 1605 $cm^{-1}$ attributed to vibration of a benzene nucleus;

Unsaturated carboxylic acid alkyl ester monomer (a2): Peak at 3460 $cm^{-1}$ which is an overtone peak of a peak at 1730 $cm^{-1}$ attributed to stretching vibration of a carbonyl group C=O of the ester;

Vinyl cyanide monomer (a3): Peak at 2240 $cm^{-1}$ attributed to —C≡N stretching.

The acetone soluble resin component mainly comprises resin components derived from the copolymer (A), but partially contains the resin components derived from a copolymer portion in the graft copolymer (B) obtained by polymerizing the vinyl monomer mixture (c). Therefore, in order to control the composition of the acetone soluble resin component in the above-described range, it is effective to control the composition of the copolymer (A), which constitutes the main component, in the above-described predetermined range. Furthermore, the composition of the copolymer portion obtained by polymerizing the vinyl monomer mixture (c) is preferably controlled in the above predetermined range.

The condition of the composition distribution of weight ratios ($\phi_{ST}/\phi_{MMA}$) of the aromatic vinyl monomer (a1) to the unsaturated carboxylic acid alkyl ester monomer (a2), which constitute the acetone soluble resin component, in which 80% by weight or more of the acetone soluble resin component lies in the range of 0.75 to 1.2 times as large as the average weight ratios ($\phi_{ST}/\phi_{MMA}$), represents that the acetone soluble resin component has a narrow composition distribution. The condition of the composition distribution is preferred for further increasing the transparency of the resin composition.

In the resin composition of the present invention, a small amount of acid component copolymerized with the matrix resin provides preferred physical properties. Therefore, it is important that the acetone soluble resin component of the resin composition has an acid value of 0.01 to 1 mgKOH/g. With an acid value of less than 0.01 mgKOH/g, the balance between the impact resistance and stiffness, which is characteristic of the present invention, is not improved, while with an acid value of over 1 mgKOH/g, the color tone of the obtained resin composition significantly deteriorates. Therefore, from the viewpoint of the color tone and physical property balance, the acid value is preferably 0.012 to 0.5 mgKOH/g, and more preferably 0.015 to 0.1 mgKOH/g.

The method of controlling the acid value in the above range is not limited, but from the viewpoint of minimization of deterioration in the color tone of the resultant resin composition, it is particularly preferred to use a monomer mixture substantially no acid monomer such as an unsaturated carboxylic acid monomer (except the unsaturated carboxylic acid alkyl ester monomer (a2)) (a5) or the like as the vinyl monomer mixture (a) used as a raw material for the copolymer (A) and/or the vinyl monomer mixture (c) used as a raw material for the graft copolymer (B), and the unsaturated carboxylic acid alkyl ester monomer (a2) is hydrolyzed to control the acid value of the resultant resin composition in the above range during the production process. The condition in which the monomer mixture contains substantially no acid monomer means that the acid value of the vinyl monomer mixture (a) and/or the vinyl monomer mixture (c) is less than 0.01 mg, preferably 0.007 mg or less. Particularly, both the vinyl monomer mixture (a) and the vinyl monomer mixture (c) contain no acid monomer such as an unsaturated carboxylic acid monomer (except the unsaturated carboxylic acid alkyl ester monomer (a2)) (a5) or the like, and have an acid value of less than 0.01 mg, more preferably 0.007 mg or less.

The physical properties of the acetone soluble resin component of the resin composition of the present invention are not limited as long as the above-described necessary conditions are satisfied. However, from the viewpoint of transparency of the resin composition, the refractive index is preferably substantially the same as or slightly deviates from the refractive index of the rubber polymer (b). More specifically, the difference in refractive index between the copolymer (A) and the rubber polymer (b) is preferably suppressed to the range of 0.03 or less, more preferably 0.01 or less.

The monomer composition which constitutes the acetone soluble resin component of the resin composition, and the preferred monomer composition which constitutes the copolymer (A) and the graft component (b) of the graft copolymer (B) are specified by using the aromatic vinyl monomer (a1), the unsaturated carboxylic acid alkyl ester monomer (a2), the vinyl cyanide monomer (a3), and the other monomer (s4) copolymerizable with these monomers. Each of the monomers includes the following compounds.

Examples of the aromatic vinyl monomer (a1) include styrene, α-methyl styrene, p-methyl styrene, vinyl toluene, t-butyl styrene, o-ethyl styrene, o-chlorostyrene, o,p-dichlorostyrene, and the like. Particularly, styrene and α-methyl styrene are preferred. These compounds can be used singly or in a mixture of at least two compounds.

Examples of the unsaturated carboxylic acid alkyl ester monomer (a2) include methyl (meth)acrylate, ethyl (meth) acrylate, n-propyl (meth)acrylate, n-butyl (meth)acrylate, t-butyl (meth)acrylate, cyclohexyl (meth)acrylate, n-hexyl (meth)acrylate, hydroxyethyl (meth)acrylate, glycidyl (meth)acrylate, hydroxyethyl (meth)acrylate, chloromethyl (meth)acrylate, 2-chloroethyl (meth)acrylate, and the like. Particularly, methyl methacrylate is preferred. These compounds can be used singly or in a mixture of at least two compounds.

Examples of the vinyl cyanide monomer (a3) include acrylonitrile, methacrylonitrile, ethacrylonitrile, and the like. Particularly, acrylonitrile is preferred. These compounds can be used singly or in a mixture of at least two compounds.

Examples of the other monomer (a4) copolymerizable with the monomers include maleimide compounds such as N-methylmaleimide, N-cyclohexylmaleimide, N-phenylmaleimide, and the like; unsaturated amides such as acrylamide and the like. These compounds can be used singly or in a mixture of at least two compounds.

Although the composition of the vinyl monomer mixture (a) used as the polymerization raw material of the copolymer (A) is not limited, the monomer composition preferably comprises 5 to 70% by weight of the aromatic vinyl monomer (a1), 30 to 95% by weight of the unsaturated carboxylic acid alkyl ester monomer (a2), 0 to 50% by weight of the vinyl cyanide monomer (a3), and 0 to 50% by weight of the other monomer (a4) copolymerizable with these monomers. From the viewpoint of impact resistance, the monomer composition more preferably comprises 9 to 50% by weight of the aromatic vinyl monomer (a1), 35 to 90% by weight of the unsaturated carboxylic acid alkyl ester monomer (a2), 0.1 to 45% by weight of the vinyl cyanide monomer (a3), and 0 to 50% by weight of the other monomer (a4) copolymerizable with these monomers. The monomer composition most preferably comprises 14 to 35% by weight of the aromatic vinyl monomer (a1), 40 to 85% by weight of the unsaturated carboxylic acid alkyl ester monomer (a2), 1 to 40% by weight of the vinyl cyanide monomer (a3), and 0 to 50% by weight of the other monomer (a4) copolymerizable with these monomers.

In order to achieve well-balanced and excellent transparency, color tone, impact resistance and chemical resistance, the composition of the vinyl monomer mixture (a) and/or the vinyl monomer mixture (c) preferably comprises 5 to 40% by weight of the aromatic vinyl monomer (a1), 30 to 80% by weight of the unsaturated carboxylic acid alkyl ester monomer (a2), 10 to 50% by weight of the vinyl cyanide monomer (a3), and 0 to 40% by weight of the other monomer (a4) copolymerizable with these monomers. The composition more preferably comprises 9 to 40% by weight of the aromatic vinyl monomer (a1), 35 to 85% by weight of the unsaturated carboxylic acid alkyl ester monomer (a2), 10 to 45% by weight of the vinyl cyanide monomer (a3), and 0 to 40% by weight of the other monomer (a4) copolymerizable with these monomers. The composition most preferably comprises 14 to 35% by weight of the aromatic vinyl monomer (a1), 40 to 75% by weight of the unsaturated carboxylic acid alkyl ester monomer (a2), 10 to 40% by weight of the vinyl cyanide monomer (a3), and 0 to 40% by weight of the other monomer (a4) copolymerizable with these monomers.

The vinyl monomer mixture (a) particularly preferably contains substantially no acid monomer such as an unsaturated carboxylic acid monomer (except the unsaturated carboxylic acid alkyl ester monomer (a2)) (a5) or the like in order to obtain the desired level of acid value of the acetone soluble resin component of the resin composition, and improve the color tone. The terms "contains substantially no acid monomer" mean that the acid monomer is intentionally not added to the monomer mixture. For example, the addition of 0.01% or more to the monomer mixture (a) can be considered as intentional addition. Less than 0.01% of unsaturated carboxylic acid which is derived from impurities of each of the monomers of the monomer mixture (a), for example, an unsaturated carboxylic acid contained as impurities in the unsaturated carboxylic acid alkyl ester monomer (a2), is a component unintentionally added. As the unsaturated carboxylic acid monomer (a5), acrylic acid, methacrylic acid, and the like are exemplified.

Each of the monomers of the vinyl monomer mixture (a) is preferably selected so that the solubility parameter of the copolymer (A) is 10.5 to 12.5 $(cal/ml)^{1/2}$. The solubility parameter is defined by the following equation.

$$\delta = (\Sigma \Delta Ei \cdot X / \Sigma \Delta Vm \cdot X)^{1/2}$$

$\delta$: Solubility parameter of the copolymer (A) $((cal/ml)^{1/2})$

X: Molar fraction (%) of the copolymer component constituting the copolymer (A)

$\Delta Ei$: Evaporation energy (cal/mol) of the copolymer component constituting the copolymer (A)

$\Delta Vm$: Molecular volume (ml/mol) of the copolymer component constituting the copolymer (A)

The above equation and the numerical values of $\Delta Ei$ and $\Delta Vm$ are cited from H. Burrell, Offic. Dig., A. J. Tortorello, M. A. Kinsella, J. Coat. Technol. From the viewpoint of the chemical resistance and mechanical properties of the thermoplastic resin composition, the solubility parameter of the copolymer (A) is preferably 10.5 to 12.5 $(cal/ml)^{1/2}$, and more preferably 10.7 to 12.3 $(cal/ml)^{1/2}$.

Although the intrinsic viscosity of the copolymer (A) is not limited, the intrinsic viscosity is preferably 0.05 to 1.2 dl/g, more preferably 0.15 to 0.8 dl/g, from the viewpoint of the balance of impact resistance and moldability.

In the composition distribution of weight ratios ($\phi_{ST}/\phi_{MMA}$) of the aromatic vinyl monomer (a1) to the unsaturated carboxylic acid alkyl ester monomer (a2) of the copolymer (A), 80% by weight or more of the copolymer (A) lies in the range of 0.75 to 1.2 times as large as the average weight ratio ($\phi_{ST}/\phi_{MMA}$).

Although the refractive index of the copolymer (A) is not limited, from the viewpoint of transparency of the resultant resin composition, the difference in refractive index from the rubber polymer (b) is preferably 0.03 or less, more preferably substantially the same as the rubber polymer (b). In order to obtain such a refractive index, the composition of the vinyl monomer mixture (a) may be controlled.

As the copolymer (A), one or not less than two copolymers may be used. In the use of a blend comprising at least two copolymers, it is preferred from the viewpoint of transparency of the resin composition that the components are optically uniformly dispersed, and the refractive index of the copolymer (A) as a whole is controlled to satisfy the above condition.

The copolymer (A) is produced by any desired method such as a known emulsion polymerization method, suspension polymerization method, continuous bulk polymerization method, or continuous solution polymerization method, or the like. However, in order to achieve a narrow composition distribution of ($\phi_{ST}/\phi_{MMA}$) in which 80% by weight or more of the copolymer (A) lies in the range of 0.75 to 1.2 times as large as the average weigh ratio ($\phi_{ST}/\phi_{MMA}$), and as mentioned below, in order to achieve a low content of the triple sequence of acrylonitrile monomer units present in the copolymer (A) and in the acetone soluble resin component, the aqueous system suspension polymerization method, continuous bulk polymerization method, or continuous solution polymerization method is preferred. The continuous bulk polymerization method or continuous solution polymerization method is particularly preferred because the residual monomer composition in the system can be kept constant in a steady reaction state, and thus the properties of the resin composition of the present invention can easily be controlled to predetermined values.

The process for producing the copolymer (A) by copolymerizing the vinyl monomer mixture (a) by continuous bulk polymerization or continuous solution polymerization is not limited, and any desired method can be used. For example, a method comprising polymerization in a polymerization vessel, and then monomer removal (solvent removal and devolatilization) can be used.

As the polymerization vessels, mixing-type polymerization vessels comprising any of various stirring wings such as paddle wings, turbine wings, propellant wings, pull-margin wings, multi-stage wings, anchor wings, "Max blend" wings, double helical wings, and the like, and various column type reactors can be used. Also, shell and tube reactors, kneader reactors, twin screw extruders, and the like can be used as the polymerization reactor (refer to, for example, Assessment 10 of Polymer Production Process "Assessment of Impact-Resistant Polystyrene", The Society of Polymer Science, Japan, Jan. 26, 1989). These polymerization vessels (reactors) are used singly or in a combination of at least two vessels, and a combination of at least two types of reactors is used according to demand. Particularly, from the viewpoint of the narrow composition distribution of the acetone soluble resin component of the obtained resin composition, a single complete mixing type polymerization vessel is preferably selected.

The reaction mixture obtained by polymerization in the polymerization vessel or reactor is generally supplied into the monomer removing step of removing the monomers, the solvent and other volatile components. Examples of the method of removing the monomers include the method of removing the volatile components through a vent port by using a single screw or twin screw extruder having vents under heating at atmospheric or reduced pressure, the method of removing the volatile components by using a vaporizer comprising a centrifugal plate-fin type heater contained in a drum, the method of removing the volatile components by a centrifugal thin film vaporizer, the method of removing the volatile components by pre-heating and foaming with a multi-pipe heat exchanger and then flashing into a vacuum vessel, and the like. Although any one of these methods can be used, the single screw or twin screw extruder having vents is particularly preferably used.

In continuous bulk polymerization or solution polymerization of the copolymer (A), thermal polymerization without using an initiator, initiator polymerization using an initiator, or a combination of the thermal polymerization and the initiator polymerization may be performed. As the initiator, a peroxide or azo compound, or the like can be used.

Examples of the peroxide include benzoyl peroxide, cumene hydroperoxide, dicumyl peroxide, diisopropylbenzene hydroperoxide, t-butyl hydroperoxide, t-butylcumyl peroxide, t-butyl peroxyacetate, t-butyl peroxybenzoate, t-butyl peroxyisopropylcarbonate, di-t-butyl peroxide, t-butyl peroctate, 1,1-bis(t-butylperoxy)-3,3,5-trimethylcyclohexane, 1,1-bis(t-butylperoxy)cyclohexane, t-butylperoxy-2-ethyl hexanoate, and the like. Particularly, cumene hydroperoxide and 1,1-bis(t-butylperoxy)-3,3,5-trimethylcyclohexane are preferably used. Examples of the azo compound include azobisisobutyronitrile, azobis(2,4-dimethylvaleronitrile), 2-phenylazo-2,4-dimethyl-4-methoxyvaleronitrile, 2-cyano-2-propylazoformamide, 1,1'-azobiscyclohexane-1-carbonitrile, azobis(4-methoxy-2,4-dimethylvaleronitrile), dimethyl-2,2'-azobisisobutylate, 1-t-butylazo-1-cyanocyclohexane, 2-t-butylazo-2-cyanobutane, 2-t-butylazo-2-cyano-4-methoxy-4-methylpentane, and the like. These initiators are used singly or a combination of at least two compounds. Particularly, 1,1'-azobiscyclohexane-1-carbonitrile is preferably used.

In order to control the degree of polymerization of the copolymer (A), a chain transfer agent such as mercaptan, terpene or the like can be used. Examples of such a chain transfer agent include n-octyl mercaptan, t-dodecyl mercaptan, n-dodecyl mercaptan, n-tetradecyl mercaptan, n-octadecyl mercaptan, terpinolene, and the like. These chain transfer agents are used singly or in a combination of at least two compounds. Particularly, n-octyl mercaptan, t-dodecyl mercaptan, and n-dodecyl mercaptan are preferably used.

In producing the copolymer (A) by the continuous solution polymerization method, the amount of the solvent used is not limited, but from the viewpoint of productivity, the amount of the solvent used is preferably 30% by weight or less, more preferably 20% by weight or less, relative to the polymerization solution. The solvent used is not limited, but from the viewpoint of polymerization stability, ethylbenzene and methyl ethyl ketone are preferably used, and ethylbenzene is more preferably used.

Although the rubber polymer (b) constituting the graft copolymer (B) is not limited in the present invention, diene rubber, acrylic rubber, ethylene rubber and the like can be used. Examples of the rubber polymer include polybutadiene, poly(butadiene-styrene), poly(butadiene-acrylonitrile), polyisoprene, poly(butadiene-butyl acrylate), poly(butadiene-methyl acrylate), poly(butadiene-methyl methacrylate), poly(butadiene-ethyl acrylate), ethylene-propylene rubber, ethylene-propylene-diene rubber, poly(ethylene-isobutylene), poly(ethylene-methyl acrylate), poly(ethylene-methyl acrylate) and the like. These rubber polymers are used singly or in a combination of at least two polymers. Particularly, from the view point of the impact resistance, polybutadiene, poly(butadiene-styrene), poly (butadiene-acrylonitrile), and ethylene-propylene rubber are preferably used.

From the viewpoint of the impact resistance, moldability, and fluidity of the resultant resin composition, the weight average particle diameter of the rubber polymer (b) is preferably 0.1 to 1.5 μm, more preferably 0.15 to 1.2 μm.

The composition of the vinyl monomer mixture (c) used as the polymerization raw material of the graft component (d) of the graft copolymer (B) is not limited, but from the viewpoint of the color tone and the physical property balance between impact resistance and stiffness of the obtained resin composition, the composition preferably comprises 5 to 70% by weight of the aromatic vinyl monomer (a1), 30 to 95% by weight of the unsaturated carboxylic acid alkyl ester monomer (a2), 0 to 50% by weight of the vinyl cyanide monomer (a3), and 0 to 50% by weight of the other monomer (a4) copolymerizable with these monomers. The monomer composition constituting the vinyl monomer mixture (c) may be the same as or different from the vinyl monomer mixture (a) constituting the copolymer (A).

Like the vinyl monomer mixture (a) used as the polymerization raw material of the styrene copolymer, the vinyl monomer mixture (c) preferably contains substantially no acid monomer such as an unsaturated carboxylic acid monomer (except the unsaturated carboxylic acid alkyl ester monomer (a2)) (a5) or the like in order to obtain the desired level of the acid value of the acetone soluble resin component of the resin composition and improve the color tone. The terms "contains substantially no acid monomer" represent the same as the vinyl monomer mixture (a) used as the polymerization raw material of the styrene copolymer.

From the viewpoint of the transparency of the resultant resin composition, the composition of the vinyl monomer mixture (c) is preferably controlled so that the refractive index of the graft component (d) of the graft copolymer (B) is substantially the same as or slightly different from that of the rubber polymer (b). More specifically, the difference in refractive index between the graft component (d) and the rubber polymer (b) is preferably suppressed to 0.03 or less, more preferably 0.01 or less.

As the graft copolymer (B), at least one copolymer can be used, but in the use of a blend comprising two or more copolymers, it is preferred from the viewpoint of the transparency of the resultant resin that the graft copolymer is preferably prepared so that the refractive index of the rubber polymer (b) contained in each component substantially agrees with the graft component (d).

The reduced viscosity ($\eta_{sp}/c$) of the graft component (d) constituting the graft copolymer (B) is not limited, but from the viewpoint of the balance between the impact resistance and moldability, the reduced viscosity is preferably 0.05 to 1.2 dl/g, and more preferably 0.1 to 0.7 dl/g.

The graft copolymer (B) is obtained by graft-polymerizing the vinyl monomer mixture (c) in the presence of the rubber polymer (b). However, the whole of the vinyl monomer mixture (c) need not be grafted, and a mixture with an ungrafted copolymer is generally used as the graft copolymer (B). The graft ratio of the graft copolymer (B) is not limited, but from the viewpoint of the impact resistance, the graft ratio is preferably 5 to 150% by weight, more preferably 10 to 100% by weight.

From the viewpoint of the mechanical strength, the color tone and moldability of the obtained resin composition, the ratio of the rubber polymer in the graft copolymer (B) is preferably 5 to 80% by weight, more preferably 20 to 70% by weight.

Although the graft polymerization method for producing the graft copolymer (B) is not limited, the graft copolymer (B) can be produced by any desired method such as the emulsion polymerization method, the suspension polymerization method, the continuous bulk polymerization method, the continuous solution polymerization method, or the like. The graft copolymer (B) is preferably produced by the emulsion polymerization method or the bulk polymerization method. Particularly, the graft copolymer (B) is most preferably produced by the emulsion polymerization method because the emulsifier content and the moisture content of the graft copolymer (B) can easily be controlled for controlling deterioration and coloring of the rubber component due to excessive thermal history, and controlling hydrolysis of the unsaturated carboxylic acid alkyl ester monomer (a2) in the step of melt kneading with the copolymer (A).

In general emulsion polymerization, the monomer mixture is emulsified and graft-polymerized in the presence of a rubber polymer latex. The emulsifier used in the emulsion graft polymerization is not limited, and various surfactants can be used. However, anionic surfactants such as a carboxylate salt type, a sulfate ester type, a sulfonate salt type, and the like.

Examples of such emulsifiers include caprylate salts, caprate salts, laurate salts, myristate salts, palmitate salts, stearate salts, oleinate salts, linolate salts, rhodinate salts, behenate salts, sulfate esters of caster oil, sulfate esters of lauryl alcohol, sulfate esters of other higher alcohols, dodecylbenzenesulfonate salts, alkylnaphthalenesulfonate salts, alkyldiphenyletherdisulfonate salts, condensation products of naphthalenesulfonate salts, dialkylsulfosuccinate salts, polyoxyethylenelaurylsulfate salts, polyoxyethylenealkylethersulfonate salts, polyoxyethylenealklylphenylethersulfonate salts, and the like. The salts include alkali metal salts, ammonium salts. Examples of the alkali metal salts include a potassium salt, a sodium salt, a lithium salt, and the like. Particularly, potassium salts and sodium salts of palmitic acid, stearic acid, oleic acid are preferably used. These emulsifiers are used singly or in a combination of at least two compounds.

As the initiator and the chain transfer agent which can be used for emulsion graft polymerization, any of the initiators and chain transfer agents described above for production of the copolymer (A) can be used, and the initiator can also be used in a redox system.

Next, a coagulating agent is added to the graft copolymer (B) produced by emulsion graft polymerization to coagulate the latex and recover the graft copolymer (B). As the coagulating agent, an acid or a water-soluble salt is used. Examples of the coagulating agent include sulfuric acid, hydrochloric acid, phosphoric acid, acetic acid, calcium chloride, magnesium chloride, barium chloride, aluminum chloride, magnesium sulfate, aluminum sulfate, aluminum ammonium sulfate, aluminum potassium sulfate, aluminum sodium sulfate, and the like. These coagulating agents are used singly or in a combination of at least two compounds. When an acid is used as the coagulating agent, it is then neutralized with an alkali. The graft copolymer (B) slurry obtained by coagulating the latex can be used as it is or in the shape of a slurry or wet cake after a dehydration and washing step. However, from the viewpoint of handling property in the step, the slurry is preferably passed through the step of dehydration, washing, re-dehydration and drying to form a powder which is then added to the copolymer (A) in the melt state.

In adding to the copolymer (A), the amount of the emulsifier contained in the material of the graft copolymer (B) is preferably 0.1 to 5% by weight, more preferably 0.15 to 2% by weight, in order to control hydrolysis reaction of the unsaturated carboxylic acid alkyl ester monomer (a2) during the step to set the acid value of the acetone soluble resin component of the obtained resin composition in the predetermined range of the present invention. It is conventionally unknown that the emulsifier can be used for controlling hydrolysis of a polymer, and thus it is generally thought that the emulsifier must be excluded from resin products as much as possible. However, in the present invention, as the effective means for controlling the acid value of the acetone soluble resin component of the resin composition in the predetermined range, the emulsifier is positively contained in the above range.

The method of controlling the emulsifier content of the graft copolymer (B) in the predetermined range is not limited. For example, the intended emulsifier content can be obtained by controlling the number of times of dehydration and washing of the graft copolymer (B) slurry after coagulation, the temperature of washing water, and the amount of washing water. Alternatively, the emulsifier content can be controlled by, for example, separately adding the emulsifier to the graft copolymer (B).

The moisture content (moisture percentage) of the graft copolymer (B) added to the copolymer (A) is preferably 0.1% or more by weight and less than 5% by weight, more preferably 0.15 to 2% by weight, in order to control hydrolysis reaction of the unsaturated carboxylic acid alkyl ester monomer (a2) during the process to set the acid value of the acetone soluble resin component of the obtained resin composition in the predetermined range of the present invention.

Although the method of controlling the water percentage of the graft copolymer (B) in the predetermined range is not limited, the desired water percentage can be obtained by, for example, controlling the dehydration time, the drying temperature and the drying air flow rate for the graft copolymer (B). Alternatively, the moisture percentage can be controlled by, for example, separately adding water to the graft copolymer (B).

The graft copolymer (B) can also be produced by the bulk polymerization method. In production by the bulk polymerization method, the graft copolymer (B) in a melt state after being discharged from the monomer remover can be added directly to the copolymer (A), or the graft copolymer (B) previously isolated can be added to the copolymer (A). However, from the viewpoint of prevention of thermal deterioration and continuation of the process, the graft copolymer (B) in the melt state after being discharged from the monomer remover is preferably added directly to the copolymer (A).

The method of blending the copolymer (A) and the graft copolymer (B) is not limited, but from the viewpoint of the color tone and impact resistance, it is preferable to select the method comprising adding the graft copolymer (B) to the copolymer (A) in the melt state in the course of the continuous bulk polymerization process or continuous solution polymerization process, and then melt-blending both copolymers. At this time, preferably, 5 to 90% by weight of the graft copolymer (B) is added to 10 to 95% by weight of the copolymer (A) in the melt state, and more preferably 5 to 70% by weight of the graft copolymer (B) is added to the 30 to 95% by weight of the copolymer (A), followed by melt blending. The graft copolymer (B) is preferably continuously added. In this method, in order to suppress deterioration of the rubber component due to thermal history in the subsequent monomer removing operation to further improve the color tone and impact resistance, the graft copolymer (B) is more preferably added to the copolymer (A) when the amount of the residual monomer is 10% by weight or less, preferably 5% by weight or less, in the course of the monomer removing step or after the monomer removing step of the continuous bulk polymerization process of the copolymer (A).

In order to further facilitate control of hydrolysis reaction of the unsaturated carboxylic acid alkyl ester monomer (a2) during the step, 0.1 to 5% by weight of water is preferably added to the resin composition in the melt kneading step after the copolymer (A) and the graft copolymer (B) are blended.

In order to sufficiently express the physical properties such as impact resistance, etc., melt blending is preferably carried out after the graft copolymer (B) is added to the copolymer (A). The melt blending may be carried out during addition and blending or after isolation of the mixture, for example, during melt molding.

The method of adding the graft copolymer (B) is not limited, and the graft copolymer (B) can be added by any desired method. The graft copolymer (B) is generally continuously added by using any of various feeders such as a belt-type feeder, a screw-type feeder, a single screw extruder, a twin screw extruder, and the like. However, the single screw extruder or twin screw extruder with the discharge end connected to the monomer removing extruder for the copolymer (A) is preferably used. Such a continuous addition apparatus preferably has a structure for feeding a predetermined amount of resin. Also, the continuous addition apparatus preferably comprises a heating device so that the graft copolymer (B) in a semi-melt state or melt state is added for improving the blending state. More specifically, the graft copolymer (B) is preferably heated so that the temperature is 100 to 220° C. at the time of supply to the monomer remover. For this purpose, the extruder comprising the heating device can be used.

Figure 2:
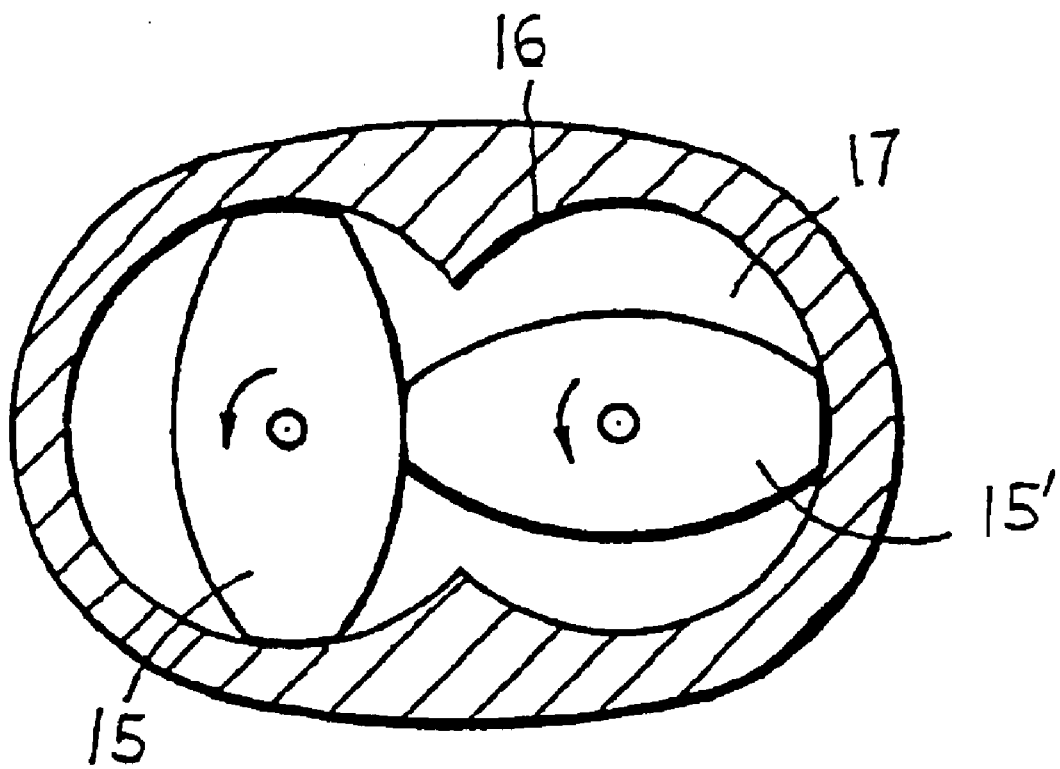
FIG. 2 is a schematic cross-sectional view of the twin screw extruder type monomer remover shown in FIG. 1.

The resin composition of the present invention can be produced by, for example, using the producing apparatus shown in FIGS. 1 and 2.

FIG. 1 is a schematic longitudinal sectional view showing an apparatus for carrying out the method of the present invention according to an embodiment of the present invention. In this apparatus, a reaction vessel (1) for producing the copolymer (A) by continuous bulk polymerization of the vinyl monomer (a), a pre-heater (2) for maintaining the copolymer (A) obtained by polymerization in a melt state at a predetermined temperature, and a twin screw extruder type monomer remover (3) having some vent ports for removing monomers are connected in turn. Furthermore, a twin screw extruder type feeder (5) for adding the graft copolymer (B) is connected in tandem to the monomer remover. FIG. 2 is a schematic cross-sectional view of the twin screw extruder type monomer remover (3) in which screws 15 and 15' are provided.

In FIG. 1, the reaction product continuously supplied from the reaction vessel (1) is maintained in a melt state at about 150 to 280° C. by the pre-heater (2), and then supplied to the twin screw extruder type monomer remover (3) for removing the volatile components such as the monomers to the outside of the system through the vent port 12 at about 150 to 300° C. and at atmospheric or reduced pressure. The volatile components are removed until the amount of the unreacted monomers becomes the predetermined amount, for example, 10% by weight or less, preferably 5% by weight or less.

In FIG. 1, a port for addition from the feeder (5) is open at an intermediate position of the monomer remover (3) near the downstream side so that the graft copolymer (B) of a predetermined temperature (about 100 to 220° C.) is added to the system. As the feeder (5), the twin screw extruder type feeder, and various feeders such as a belt-type feeder, a screw-type feeder, and the like can be used for continuously quantitatively adding the resin. The feeder (5) also comprises a heater for maintaining the added graft copolymer (B) in a melt state or a semi-melt sate in which the copolymer is incompletely melted. Namely, in feeding to the monomer remover, the graft copolymer (B) is preferably heated to a temperature of 100 to 220° C. to improve the mixing state. For example, a screw, a cylinder and a screw driving unit are preferably provided, the cylinder having a structure heating and cooling function. As the feeder, a single screw or twin screw extruder type feeder having a heater can also be used.

The supply port of the graft copolymer (B) may be provided at an intermediate position of the monomer remover (3). In this case, the graft copolymer (B) is preferably supplied at the step in which the amount of the unreacted monomer is decreased to 10% by weight or less, more preferably 5% by weight or less, in order to prevent thermal deterioration of the rubber component in the subsequent operation of removing the unreacted monomer and further improve the color tone and impact resistance of the obtained resin composition.

In FIG. 1, the copolymer (A) and the graft copolymer (B) are transferred while being melted and kneaded at a temperature of 230° C. or more in the melt blending portion (4) of the twin screw extruder type monomer remover (3). The inner wall (16) of the barrel of the twin screw extruder type monomer remover (3) has a sectional shape in which two circles are connected to each other with overlapped portions, as shown in FIG. 2. The monomer remover (3) comprises the two screws 15 and 15' provided therein to be rotated with the centers of the respective circles as axes. Since the two screws 15 and 15' are rotated at the same speed with a predetermined phase difference, the resin composition is transferred to a discharge port (6) while being mixed by rotation of the screws.

In the present invention, from the viewpoint of the transparency, appearance, color tone, impact resistance of the resultant rubber-reinforced styrene transparent resin composition, the actual volume V of the melt blending portion (4) in which the copolymer (A) and the graft copolymer (B) are transferred while being melted and mixed, the moving velocity v and temperature T are preferably set to satisfy the predetermined conditions (the conditions ① and ② below). The melt blending portion (4) extends from the position (the center thereof) where the port for addition from the twin screw extruder type feeder (5) is open to the discharge port (6).

The actual volume (Vm³) of the melt blending portion (4) in the apparatus is represented by the value obtained by subtracting the screw volume present in the melt blending portion (4) from the barrel volume in the melt blending portion (4). The moving velocity (v kg/h) means the discharge rate of the resin composition discharged from the melt blending portion (4) to the outside of the system. The temperature (T° C.) means the set temperature in the melt blending portion (4).

$$4.60\times10^{-6} \leq V/v \leq 11.50\times10^{-6} \ (m^3 \cdot h/kg) \quad ①$$

$$T \geq 230 \ (° C.) \quad ②$$

More preferably, $$6.15\times10^{-6} \leq V/v \leq 9.40\times10^{-6} \ (m^3 \cdot h/kg) \quad ①'$$

From the viewpoint of a kneading property, the temperature (T° C.) of the melt blending portion (4) is preferably 230° C. or more, and more preferably 235 to 300° C. The resin temperature of the graft copolymer (B) before being added to the melt blending portion (4) is preferably 100 to 220° C., and particularly preferably 220° C. or less in the melt or semi-melt state. The temperature of the copolymer (A) before reaching the melt blending portion (4) is not limited, but it is preferably about 150 to 300° C.

From the viewpoint of controllability of hydrolysis of the resultant rubber-reinforced styrene transparent resin composition, the melt blending portion (4) preferably comprises a water inlet (13) for adding a predetermined amount of water. The added water and the residual monomer are evaporated from the vent port (14) provided on the downstream side.

In the present invention, from the viewpoint of the color tone stability of the thermoplastic resin composition, the ratio of a triple sequence of acrylonitrile monomer units present in the acetone soluble resin component of the resin composition is preferably 10% by weight or less relative to the amount of the acetone soluble resin component. The triple sequence of acrylonitrile monomer units represents a segment in a copolymer contained in the acetone soluble resin component, which is represented by the following Formula 1. When the copolymer containing the segment is exposed to high temperature, intramolecular cyclization reaction proceeds to cause coloring according to the following Formula 2.

Formula 1
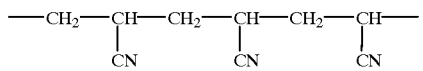

Formula 2
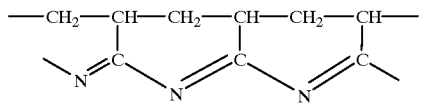

From the viewpoint of color tone stability, the ratio of the triple sequence is preferably less than 8% by weight, and more preferably 5% by weight or less. The resin composition in which the ratio of the triple sequence of acrylonitrile monomer units of the acetone soluble resin component is controlled to 10% by weight or less can be achieved by, for example, using the copolymer (A) in which the ratio of the triple sequence of acrylonitrile monomer units is controlled to 10% by weight or less.

In the present invention, in adding and mixing the graft copolymer (B) to and with the copolymer (A) in the melt state, a pelletized thermoplastic resin (C) is preferably previously added to the graft copolymer (B), and then mixed in a semi-melt or melt state, and then the resultant mixture is mixed with the copolymer (A). This method can suppress fusion of the graft copolymer (B) and a failure in re-dispersion when only the graft copolymer (B) is put into the semi-melt or melt state, thereby improving the appearance, color tone, impact resistance, stiffness and transparency of the obtained resin composition.

In the present invention, "pelletized thermoplastic resin" means a resin having a so-called pellet shape obtained by cooling and cutting the resin melt-discharged from the extruder or the like, and is distinguished from a powder resin obtained by emulsion polymerization and coagulation without a melting and solidification step, and a beads resin obtained by suspension polymerization.

In the present invention, the shape of the pelletized thermoplastic resin (C) is not limited, but in order to obtain the balance between the appearance, color tone, impact resistance and stiffness, and improve transparency, the average particle diameter of the pelletized thermoplastic resin (C) is preferably 1 to 10 mm. With an average particle diameter in this range, the material transfer property and mixing state in addition and mixing of the pelletized thermoplastic resin (C) to and with the graft copolymer (B) can be improved to further improve the effect of the present invention. From the viewpoint of the balance between the appearance, color tone, impact resistance and stiffness, and transparency, the average particle diameter of the pelletized thermoplastic resin (C) is preferably 1.5 to 7 mm, more preferably 1.8 to 5 mm, and most preferably 2 to 4 mm.

The material of the pelletized thermoplastic resin (C) is not limited as long as it has compatibility with the graft copolymer (B) and the copolymer (A). However, from the viewpoint of the appearance, color tone, impact resistance and stiffness, and transparency, particularly, the thermoplastic resin preferably comprises a copolymer (C1) obtained by polymerizing a vinyl monomer mixture comprising at least one monomer selected from aromatic vinyl monomers, vinyl cyanide monomers, unsaturated carboxylic acid ester monomers, and vinyl monomers copolymerizable with these monomers, and/or a graft copolymer (C2) obtained by graft-polymerizing a vinyl monomer mixture comprising at least one monomer selected from aromatic vinyl monomers, vinyl cyanide monomers, unsaturated carboxylic acid ester monomers, and vinyl monomers copolymerizable with these monomers in the presence of a rubber polymer. Particularly, from the viewpoint of compatibility with the graft copolymer (B) and the copolymer (A), the pelletized thermoplastic resin (C) is preferably obtained by continuously or intermittently extracting a portion, or intermittently extracting the whole, of the resultant resin composition or the copolymer (A) obtained without adding the graft copolymer (B).

Although the equipment for feeding the pelletized thermoplastic resin (C) is not limited, the equipment preferably a combination of an equipment for continuously or intermittently extracting a portion, or intermittently extracting the whole, of the resultant resin composition or the copolymer (A) from the line for transferring the material as a product, an equipment for storing the extracted pelletized thermoplastic resin (C), and an equipment for continuously supplying to the feeder for feeding the graft copolymer (B) to the copolymer (A) in the melt state.

The amount of the pelletized thermoplastic resin (C) added is not limited, but from the viewpoint of the appearance, color tone, impact resistance and stiffness of the obtained resin composition, transparency and productivity, the amount is preferably 0.1 to 30% by weight, more preferably 5 to 25% by weight, relative to the graft copolymer (B).

The resin composition of the present invention may further contain vinyl chloride; a polyolefin such as polyethylene, polypropylene, or the like; a polyamide such as nylon 6, nylon 66, or the like; a polyester such as polyethylene terephthalate, polybutylene terephthalate, polycyclohexanedimethyl terephthalate, or the like; polycarbonate; elastomer; and the like, which are added for improving the performance as a molding resin. Also, if required, the resin composition may further contain various stabilizers such as an antioxidant such as a hindered phenol type, a sulfur-containing organic compound, a phosphorus-containing organic compound, or the like, a thermal stabilizer such as a phenol type, an acrylate type, or the like; an ultraviolet absorber such as a benzotriazole type, a benzophenone type, a salicylate type, or the like; and a light stabilizer such as an organonickel type, a hindered amine type, or the like; a lubricant such as a higher fatty acid metal salt, a higher fatty acid amide, or the like; a plasticizer such as phthalate ester, phosphate ester, or the like; a frame retardant or frame retardant auxiliary such as a halogen compound such as polybromodiphenyl ether, tetrabromobisphenol A, brominated epoxy oligomer, brominated polycarbonate oligomer, or the like, a phosphorus compound, antimony trioxide, or the like; an antistatic agent; a pigment or dye such as carbon black, titanium oxide, or the like. The method of adding these additives is not limited, and the additives can be added by any of various methods such as the method of continuously adding the additives together with the graft copolymer (B), the method of forming pellets of the mixture of the copolymer (A) and the graft copolymer (B), and then adding the additives in the subsequent step, etc.

The thus-obtained resin composition of the present invention has excellent transparency, color tone, impact resistance, stiffness, and chemical resistance, and the excellent mechanical strength balance between impact resistance and stiffness, moldability, and cost performance. Therefore, the resin composition can be widely used in the fields of household electrical goods, communication-related equipment, general merchandise, etc.

Also, the resin composition can be efficiently produced by the method of the present invention.

The present invention will be described in further detail below with reference to examples and comparative examples, but the present invention is not limited to these examples. In description below, "%" means "% by weight", and "parts" means "parts by weight" unless otherwise specified.

The analysis methods of properties of the resin composition and properties of each resin component of the present invention are also described below. The general properties of resins such as impact resistance, tensile strength, etc. were measured by using a test piece formed by injection molding according to the test methods below.

(1) Weight Average Rubber Particle Diameter of the Rubber Polymer

The sodium alginate method described in "Rubber Age Vol. 88, p. 484–499 (1960), by E. Schmidt. P. h. Biddison" was used. Namely, the fact that the particle diameter of creamed polybutadiene depends upon the concentration of sodium alginate was employed for determining the particle diameter at a cumulative weight percentage of sodium alginate concentration of 50% from the weight ratio of the creamed polybutadiene and the cumulative weight percentage.

(2) Graft Ratio of the Graft Copolymer (B)

100 ml of acetone was added to a predetermined amount (m; about 1 g) of the graft copolymer (B) dried under vacuum at 80° C. for 4 hours, and refluxed in a hot water bath of 70° C. for 3 hours. Then, the resultant solution was centrifuged at 8800 rpm (10000 G) for 40 minutes, and the insoluble material was filtered off and dried under vacuum at 80° C. for 4 hours, followed by measurement of the weight (n). The graft ratio was calculated according to the following equation wherein L was the rubber content of the graft copolymer.

$$\text{Graft ratio } (\%) = \{[(n)-(m) \times L]/[(m) \times L]\} \times 100$$

(3) Emulsifier Content of the Graft Copolymer (B)

About 20 g of the graft copolymer (B) dried under vacuum at 80° C. for 4 hours was weighed, and a 10-fold amount of 10% sulfuric acid was added thereto, followed by boiling in a 500-ml beaker for 30 minutes. After the mixture was filtered with a 100-mesh wire mesh to obtain the residual solid, the solid was washed in 200 ml of ion-exchanged water for 1 minute and then filtered off two times each. The solid was divided into two parts which were then respectively placed in round-bottom flasks. Then, 100 ml of methanol was added to each of the flasks, and refluxed in a hot water bath set to 70° C. for 3 hours. The solution and the solid were centrifuged at 8800 rpm (10000 G) for 40 minutes, and the supernatant was filtered. The resultant filtrate was evaporated to dryness and further dried under vacuum at 80° C. for 4 hours to obtain a solid. The thus-obtained solid was precisely weighed as the emulsifier contained in the graft copolymer (B), and the emulsifier content was calculated.

(4) Moisture Percentage of the Graft Copolymer (B)

A measurement sample was precisely weighed, and measured by using a Karl Fischer moisture meter.

(5) Reduced Viscosity $\eta_{sp}/c$ of the Copolymer (A)

A measurement sample was dissolved in methyl ethyl ketone, and the reduced viscosity $\eta_{sp}/c$ was measured at 30° C. by using a 0.4 g/100 ml methyl ethyl ketone solution and an Ubbelohde viscometer.

(6) Reduced Viscosity $\eta_{sp}/c$ of the Graft Component (d)

200 ml of acetone was added to 1 g of the graft copolymer (B) dried under vacuum at 80° C. for 4 hours, and refluxed in a hot water bath of 70° C. for 3 hours. The solution was centrifuged at 8800 rpm (10000 G) for 40 minutes, and the insoluble material was filtered off. The resultant filtrate was concentrated by a rotary evaporator, and the precipitate was dried under vacuum at 80° C. for 4 hours. The precipitate was dissolved in methyl ethyl ketone, and the reduced viscosity ηsp/c was measured at 30° C. by the same method as described above in (5) using a 0.4 g/100 ml methyl ethyl ketone solution and the Ubbelohde viscometer.

(7) Monomer Composition of the Acetone Soluble Resin Component 100 ml of acetone was added to the resin composition, and refluxed in a hot water bath of 70° C. for 3 hours. The solution was centrifuged at 8800 rpm (10000 G) for 40 minutes, and then the insoluble material was filtered off. The resultant filtrate was concentrated by a rotary evaporator, and the precipitate was dried under vacuum at 80° C. for 4 hours. The thus-obtained acetone soluble resin component was formed in a film having a thickness of 30±5 μm by heating press set to 220° C. The film was used as a sample and measured by FT-IT analysis to determine the monomer composition from the area of each of the peaks appearing in the obtained chart. The monomers and the peaks have the following correspondences:

Methyl methacrylate monomer unit: Peak at 3460 cm-1 which is an overtone peak of the peak at 1730 $cm^{-1}$ attributed to stretching vibration of the ester carbonyl group C=O;

Methacrylic acid monomer unit: Peak at 1690 $cm^{-1}$ attributed to stretching vibration of the carboxylic acid carbonyl group C=O;

Styrene monomer unit: Peak at 1605 $cm^{-1}$ attributed to vibration of the benzene nucleus;

Acrylonitrile monomer unit: Peak at 2240 $cm^{-1}$ attributed to —C≡N stretching.

(8) ($\phi_{ST}/\phi_{MMA}$) Distribution of the Acetone Soluble Resin Component 80 ml of methyl ethyl ketone was added to 2 g of the sample of the acetone soluble resin component obtained by the same method as (7), and the resultant mixture was allowed to stand at room temperature for 24 hours to form a solution. Then, cyclohexane was added slowly to the solution, and the weights of the precipitated vinyl copolymers were successively measured. The thus-obtained precipitates were used as samples, and the monomer composition was determined by FT-IR by the same method as (7). Then, the weight ratio ($\phi_{ST}/\phi_{MMA}$) of the content of the aromatic vinyl monomer (a1) to the content of the unsaturated carboxylic acid alkyl ester monomer (a2) was plotted against the cumulative weight percentage of the precipitates relative to the acetone soluble resin component used as the sample. The ratio (% by weight) of the acetone soluble resin component lying in the range of 0.75 to 1.2 times as large as the average weight ratio of the whole acetone soluble resin component was determined.

(9) Acid Value of the Acetone Soluble Resin Component 100 ml of acetone was added to 10 g of the resin composition, and refluxed in a hot water bath of 70° C. for 3 hours. The resultant solution was centrifuged at 8800 rpm (10000 G) for 40 minutes, and then the insoluble material was filtered off. The filtrate was slowly poured into 2 L of methanol under stirring at room temperature to cause reprecipitation, and the supernatant was removed to obtain a precipitate. The thus-obtained precipitate was dissolved in 200 ml of acetone, and reprecipitated with 2 L of methanol, and the obtained precipitate was dried under vacuum at 80° C. for 4 hours to obtain a solid (acetone soluble resin component). These operations were performed for several samples to obtain the acetone soluble resin component. About 10 g of the acetone soluble resin component was precisely weighed, and placed in a 100-ml stoppered conical flask. Then, 40 ml of acetone was added to the flask and stirred for 2 hours to form a homogenous solution. Then, three droplets of phenol phthalein solution were added to the solution to perform neutralization titration with 1/10N KOH. The acid value was calculated by using the titration value according to the following equation. Neutralization titration of acetone stirred for 2 hours was also performed by the same method as the measurement sample, and the titration value was used as a blank for correcting the titration value of the sample.

$$\text{Acid value} = \frac{(X - X_0) \times 5.61 \times 0.1}{W} (\text{mg KOH/g})$$

In the above equation, X is the titration value (ml), $X_0$ is the blank titration value, and W is the sample amount (g).

(10) Acid Value of the Vinyl Monomer Mixture

The acid value was measured by the same method as (9) except that the vinyl monomer mixture was used as a sample in place of the acetone soluble resin component.

(11) Ratio of a Triple Sequence of Acrylonitrile Monomer Units of the Acetone Soluble Resin Component The acetone soluble resin component obtained by the same operation as (7) was used as a sample, and measured by $^{13}$C-NMR. The ratio of the triple sequence was determined from the signal integral value by utilizing the fact that the signal shift of α-carbon of an acrylonitrile monomer unit slightly varies with the type of adjacent monomers, and indicated as the weight percentage of the acrylonitrile monomer units at the centers of the triple sequences in the total monomer units. The measurement conditions were as follows.

Apparatus: JEOL LNM-GSX400 model

Observation frequency: 100.5 MHz

Solvent: DMOS-$d^6$

Concentration: 445 mg/2.5 mL

Chemical shift reference: Me$_4$Si
Temperature: 110° C.
Observed range: 20000 Hz
Data point: 32K
Flip angle: 90 (21 s)
Pulse delay time: 5.0 s
Number of integrations: 7400 or 8400
Decoupling: Gated decoupling (without NOE)
Attribution of acrylonitrile sequence (A: acrylonitrile, S: styrene):
-A-A-A-118.6 to 119.2 ppm
-A-A-S-119.3 to 120.2 ppm
-S-A-A-120.2 to 121.3 ppm

(12) Ratio of a Triple Sequence of Acrylonitrile Monomer Units in the Copolymer (A)

The same operation as (8) was repeated except that the copolymer (A) was used in place of the acetone soluble resin component.

(13) Refractive Index of the Copolymer (A), Graft Component (d) or Acetone Soluble Resin Component A small amount of 1-bromonaphthalene was added dropwise to a measurement sample, and the refractive index was measured by using an Abbe refractometer under the following conditions:

Light source: Sodium lamp D line
Temperature: 20° C.

As a sample of the graft component (d), the precipitate dried under vacuum and obtained by the same method as (6) was used.

As a measurement sample of the acetone soluble resin component, the acetone soluble resin component obtained by the same method as (7) was used.

(14) Refractive Index of the Rubber Polymer (b)

The values below obtained from documents were used. For the copolymer rubber, the rubber was identified by FT-IR and viscoelasticity measurement, etc., and the refractive index was determined from the copolymer components according to the following equation:

Refractive index of polybutadiene: 1.516

$n_D = 1.516 M_{PB} + 1.594 M_{PS} + 1.516 M_{PA}$ wherein;
$n_D$: refractive index of copolymer rubber;
$M_{PB}$: butadiene content (wt %);
$M_{PS}$: styrene content (wt %); and
$M_{PA}$: acrylonitrile content (wt %).

(15) Color Tone (YI Value) of the Resin Composition
Measured according to JIS K7103.

(16) Transparency of the Resin Composition (Total Light Transmittance, Haze Value)

A molding machine IS50A produced by Toshiba Co., Ltd., in which the cylinder temperature was set to 250° C., was filled with pellets of the resin composition, which was dried in a hot air dryer of 80° C. for 3 hours, and a sectoral molding (thickness 3 mm) was immediately molded. The total light transmittance and haze value were measured by using a direct-reading haze meter produced by Toyo Seiki Co., Ltd.

(17) Izod Impact Strength of the Resin Composition
Measured according to ASTM D256 (23° C., with a notch).

(18) Tensile Strength of the Resin Composition
Measured according to ASTM 638.

(19) Chemical Resistance

Figure 4:
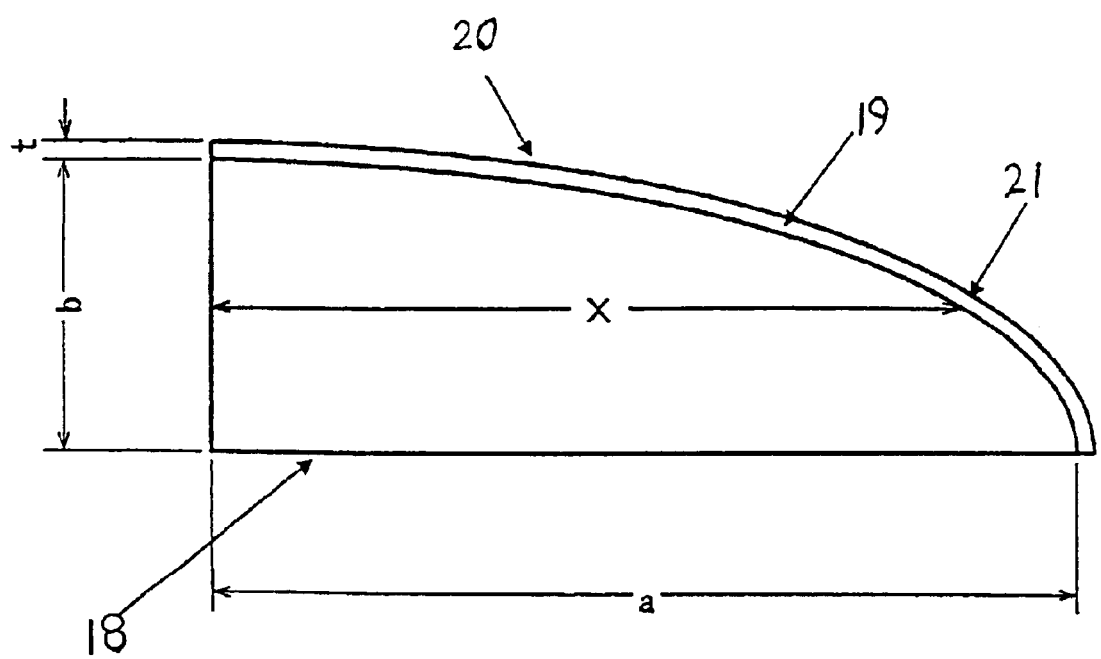
FIG. 4 is a schematic longitudinal sectional view illustrating a 1/4 elliptical tool used for evaluating chemical resistance, and the method of using the tool.

As shown in FIG. 4, a test piece (127×12.7×1.5 mm) 19 obtained by press molding was fixed along a 1/4 elliptical tool 18, and then a chemical (ethanol, isopropanol, or a liquid detergent "Top") was coated over the entire surface of the molded product. A paper wiper ("Kimwipe" produced by Kresia Co., Ltd.) was placed on the product, and sufficiently infiltrated with the chemical. In order to suppress evaporation of the chemical, the molded product was placed in a plastic bag together with the 1/4 elliptical tool 18, and closely sealed. The bag was allowed to stand at 23° C. for 24 hours, and then the occurrence of crazes and cracks was confirmed. The long axis length of the crack point (X mm) was measured, and critical strain ($\epsilon$%) was calculated by the following equation. In evaluation, a value of critical strain of less than 0.5% was marked with ×, a value of critical strain of 0.5% to 1.0% was marked with Δ, a value of critical strain of 1.0% to 2.0% was marked with ○, and a value of critical strain of over 2.0% was marked with ◉.

$$\varepsilon = \frac{b \cdot t}{2a^2}\left(1 - \frac{X^2(a^2-b^2)}{a^4}\right)^{-3/2} \times 100 \, (\%)$$

However, the symbols in the above equation and FIG. 4 are as follows:
$\epsilon$: Critical strain (%)
a: Long axis of the tool (mm) [127 mm]
b: Short axis of the tool (mm) [38 mm]
t: Thickness of the test piece (mm) [1.5 mm]
X: Long axis length of crack point (mm)

(20) Actual Volume of the Melt Blending Portion in Apparatus, V (m$^3$)

Figure 3:
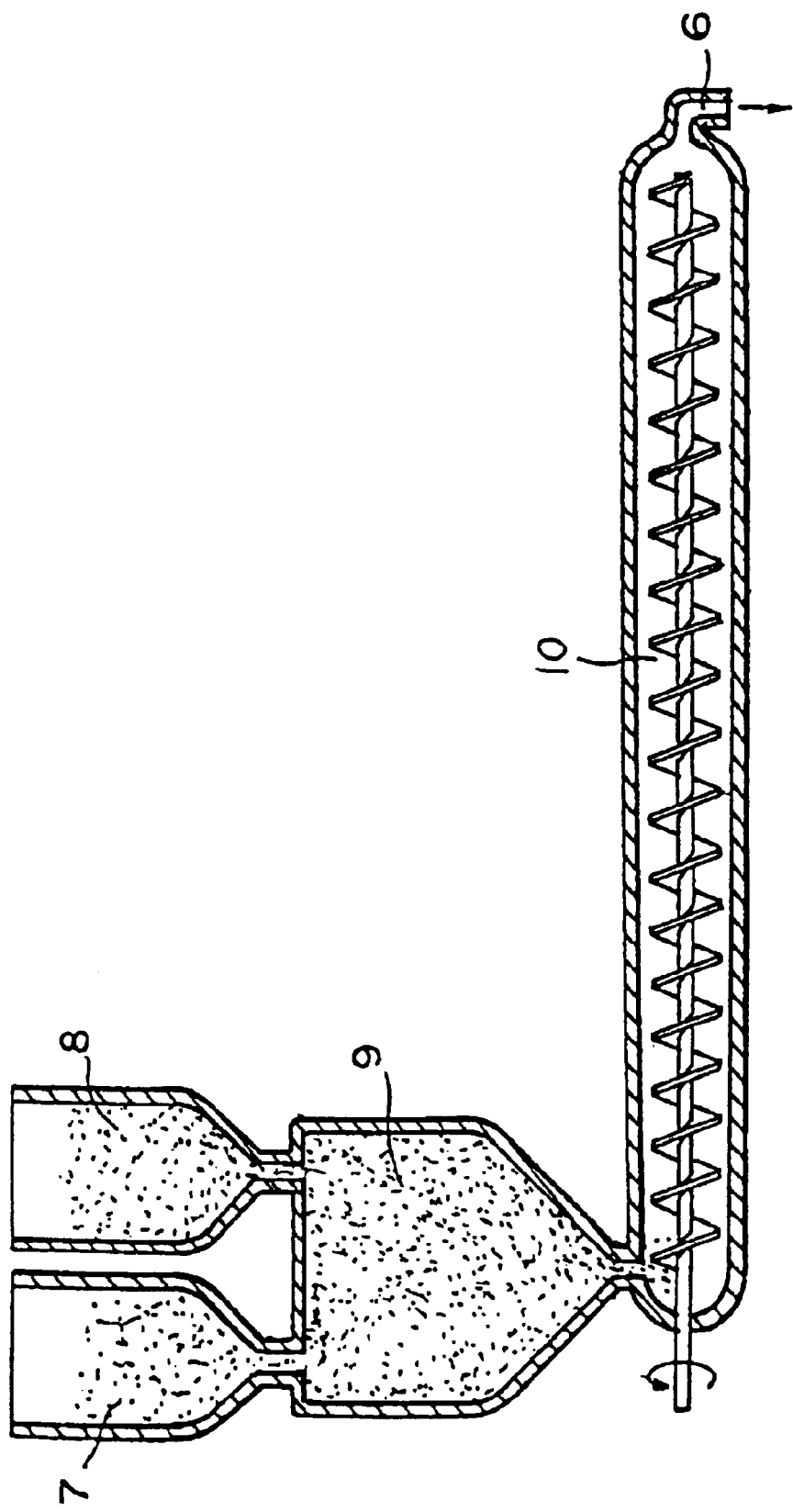
FIG. 3 is a schematic longitudinal sectional view showing an example of a melting twin-screw blending apparatus for blending a vinyl copolymer and a graft copolymer.

In the melt blending apparatus shown in FIG. 1, the melt blending portion extends from the center of the port for addition from the twin screw extruder feeder (5) to the discharge portion (6). In the melt blending apparatus (4) shown in FIG. 3, the whole apparatus corresponds to the melt blending portion. The volume of the barrel in the melt blending portion was determined, and the screw volume in the melt-blending portion was subtracted from the barrel volume to determine the actual volume in the apparatus [V (m$^3$)].

(21) Moving Velocity of the Resin Composition Finally Discharged, v (kg/h)

The polymer discharged within a predetermined time was dried, and weighed, and the polymer moving velocity v (kg/h) was determined by weight/time.

(22) Appearance 30 g of pellets were held between upper and lower molds in a heating press controlled to 220° C., and maintained for 3 minutes. Then, the ends of the melted sample were stretched to form a film, and the appearance was evaluated by visually observing the amount of spots (fish eye) based on the criteria of excellent (◉), good (○), possible (Δ), and poor (×).

(23) Average Particle Diameter of Pellets

The average particle diameter is determined by measuring the lengths of each pellet in the perpendicular three directions (length, width and height) and averaging the measurements to determine the particle diameter of the pellet, and further averaging the particle diameters of 50 pellets.

REFERENCE EXAMPLE (B) Graft Copolymer

B-1: 50 parts (in terms of solid content) of polybutadiene latex (rubber particle diameter 0.3 μm, gel content 85%), 180 parts of pure water, 0.4 part of sodium formaldehyde sulfoxylate, 0.1 part of sodium ethylenediamine tetracetate, 0.01 part of ferrous sulfate, and 0.1 part of sodium phosphate were placed in a reactor. After nitrogen purge, the temperature was controlled to 65° C., and a mixture of 11.5 parts of styrene, 4.0 parts of acrylonitrile, 34.5 parts of methyl methacrylate, and 0.3 part of n-dodecyl mercaptan was added dropwise to the reactor over 4 hours under stirring. At the same time, a mixture of 0.25 part of cumene hydroperoxide, 2.5 parts of sodium oleate as an emulsifier, and 25 parts of pure water was continuously added dropwise to the reactor over 5 hours. After dropwise addition, the reactor was maintained for 1 hours to terminate polymerization.

The latex product obtained by terminating polymerization was poured into 2000 parts of water of 95° C. containing 1.0 part of sulfuric acid under stirring to coagulate the product, and then the product was neutralized with 0.8 part of sodium hydroxide to obtain a coagulate slurry. The thus-obtained slurry was centrifuged, washed in 2000 parts of water of 40° C. for 5 minutes, and then centrifuged. The residue was dried in a hot air dryer of 60° C. for 12 hours to prepare a powdery graft copolymer. The graft properties, the refractive index of the graft component, the emulsifier content and the moisture percentage of the obtained graft copolymer (B-1) were as shown in Table 1.

B-2: Polymerization, coagulation, neutralization, washing, drying and separation were performed by the same method as B-1 except that a vinyl monomer mixture having the composition shown in Table 1 and polybutadiene latex were used to prepare the graft copolymer (B-2) shown in Table 1. The graft properties, the refractive index of the graft component, the emulsifier content and the moisture percentage of the obtained graft copolymer (B-2) were as shown in Table 1.

B-3: Polymerization, coagulation and neutralization were performed by the same method as B-1, and then the resultant coagulate slurry was centrifuged. Then, the work of washing in 2000 parts of water of 60° C. for 10 minutes and centrifuging was repeated three times. The residue was dried in a hot air dryer of 60° C. for 48 hours to prepare a powdery graft copolymer (B-3). The graft properties, the refractive index of the graft component, the emulsifier content and the moisture percentage of the obtained graft copolymer (B-3) were as shown in Table 1.

B-4: Polymerization, coagulation, neutralization, washing, drying and separation were performed by the same method as B-1 except that a vinyl monomer mixture having the composition shown in Table 1 and polybutadiene latex were used to prepare the graft copolymer (B-4) shown in Table 1. The graft properties, the refractive index of the graft component, the emulsifier content and the moisture percentage of the obtained graft copolymer (B-4) were as shown in Table 1.

EXAMPLES

Example 1

Using a continuous bulk polymerization apparatus comprising a complete mixing-type polymerization vessel of 2 m$^3$ having a condenser for evaporating and refluxing a monomer vapor and helical ribbon wings, a single screw extruder type preheater, a twin screw extruder type monomer remover of Ø90 mm having a barrel length of 4.2 m, and a twin screw extruder type feeder having a heater, tandemly connected to the barrel portion at a length of 1.4 m from the end of the monomer remover, polymerization and resin mixing were carried out.

First, a monomer mixture containing 23.0 parts of styrene, 8.0 parts of acrylonitrile, 69.0 parts of methyl methacrylate, 0.15 part of n-octyl mercaptan, and 0.01 parts of di-t-butyl peroxide was continuously fed into the polymerization vessel at 150 kg/hr, followed by continuous bulk polymerization at a polymerization temperature kept at 130° C. and the pressure in the vessel kept at 0.08 MPa. The monomer conversion of the polymerization reaction mixture in the polymerization vessel was controlled to 74 to 76%.

The polymerization reaction mixture was pre-heated by the single screw extruder type preheater, and then the unreacted monomer was evaporated under reduced pressure and recovered from the vent port of the twin screw extruder type monomer remover. The recovered unreacted monomer was continuously returned to the polymerization vessel. At the position of 1.4 m from the outlet end of the monomer remover, 0.225 kg/hr of t-butylhydroxytoluene as a phenolic stabilizer, 0.225 kg/hr of tri(nonylphenyl) phosphate serving as a phosphorus type stabilizer, and the graft copolymer (B-1) produced in the reference example and heated to a semi-melt state were supplied to the styrene/acrylonitrile/methyl methacrylate copolymer, which had an appearance monomer conversion increased to 99% or more, from the twin screw extruder type feeder at a rate of 60 kg/hr, and melt-blended with the styrene/acrylonitrile/methyl methacrylate copolymer in the monomer remover. In the melt blending state, water was supplied at 2 kg/hr at a position of 0.7 m from the outlet end of the monomer remover. The water and other volatile components were evaporated under reduced pressure and removed through the vent port provided on the downstream side of the monomer remover. Then, the melt polymer was discharged in a strand shape, and cut by a cutter to obtain resin composition pellets. The conditions of the melt blending portion and the evaluation results of resin properties are shown in Tables 3 and 4, respectively.

Examples 2 and 4 to 7, Comparative Examples 1 to 3

The same process as Example 1 was repeated except that the monomer compositions supplied to the polymerization vessel, the types of the graft copolymers (B), the feed rate of the components and the water, were as shown in Table 2 to obtain resin composition pellets. The evaluation results of the resin properties are shown in Table 4.

Example 3

0.05 part of copolymer comprising 20% by weight of methyl methacrylate, and 80% by weight of acrylamide was dissolved in 165 parts of ion exchanged water, and the resultant solution was stirred at 400 rpm in a stainless steel autoclave having a volume of 200 L and comprising a baffle and a Pfaudler stirring wing, and the system was replaced with nitrogen gas. Next, a mixed solution containing 23.0 parts of styrene, 8.0 parts of acrylonitrile, 69.0 parts of methyl methacrylate, 0.15 part of t-dodecyl mercaptan, and 0.45 part of 2,2'-azobisbutyronitrile was added to the reaction system under stirring. After the temperature was increased to 58° C., polymerization was started. After the start of polymerization, the reaction temperature increased to 65° C. over 125 minutes. After that, the temperature was increased to 100° C. over 50 minutes. Then, cooling of the reaction system, and separation, washing and drying of the resultant polymer were carried out according to conventional methods to obtain beaded copolymer (A).

The thus-obtained beaded copolymer (A) and the graft copolymer (B-1) produced in REFERENCE EXAMPLE were blended at each of the ratios shown in Table 2. Furthermore, 0.1 part of t-butylhydroxytoluene as a phenolic stabilizer and 0.1 part of tri(nonylphenyl) phosphate as a phosphorus type stabilizer were added to the resultant mixture, followed by dry blending. Then, using a twin screw extruder of Ø90 mm having a barrel length of 4.2 mm, a water injection equipment provided at a length of 1.4 m from the outlet end and a vent provided at a length of 0.7 m from the outlet end, the resultant mixture was melt-kneaded at 240° C. under injection of water to the resin composition at a rate of 1% by weight, extruded and then pelletized to obtain resin composition pellets. The evaluation results of resin properties are shown in Table 4.

Example 8

Using a continuous bulk polymerization apparatus comprising a complete mixing-type polymerization vessel of 2 m$^3$ having a condenser for evaporating and refluxing a monomer vapor and helical ribbon wings, a single screw extruder type preheater, and a twin screw extruder type monomer remover, polymerization was carried out.

First, a monomer mixture containing 20.0 parts of styrene, 20.0 parts of acrylonitrile, 60.0 parts of methyl methacrylate, 0.15 part of n-octyl mercaptan, 0.01 part of di-t-butyl peroxide was continuously supplied to the polymerization vessel at 150 kg/hr, followed by continuous bulk polymerization at a polymerization temperature kept at 130° C. and the pressure in the vessel kept at 0.08 MPa. The monomer conversion of the polymerization reaction mixture in the polymerization vessel was controlled to 74 to 76%.

The polymerization reaction mixture was pre-heated by the single screw extruder type preheater, and then the unreacted monomer was evaporated under reduced pressure and recovered from the vent port of the twin screw extruder type monomer remover. The recovered unreacted monomer was continuously returned to the polymerization vessel. Then, the melt polymer was discharged in a strand shape, and cut by a cutter to obtain pellets of the vinyl copolymer (A).

The thus-obtained pellets of the vinyl copolymer (A) and the graft copolymer (B-1) produced in REFERENCE EXAMPLE were blended at each of the ratios shown in Table 2. Furthermore, 0.1 part of t-butylhydroxytoluene as a phenolic stabilizer and 0.1 part of tri(nonylphenyl) phosphate as a phosphorus type stabilizer were added to the resultant mixture, followed by dry blending. Then, using a twin screw extruder of Ø90 mm having a barrel length of 4.2 mm, and comprising a water injection equipment provided at a length of 1.4 m from the outlet end and a vent provided at a length of 0.7 m from the outlet end, the resultant mixture was melt-kneaded at 240° C. under injection of water to the resin composition at a rate of 1% by weight, extruded and then pelletized to obtain resin composition pellets. The evaluation results of resin properties are shown in Table 4.

Example 9

The same process as EXAMPLE 4 was repeated except that a continuous bulk polymerization apparatus comprising a complete mixing-type polymerization vessel of 2 m$^3$ having a condenser for evaporating and refluxing a monomer vapor and helical ribbon wings, a single screw extruder type preheater, and a twin screw extruder type monomer remover of Ø90 mm having a barrel length of 4.2 m, and a twin screw extruder type feeder having a heater, tandemly connected to the barrel portion at a length of 0.7 m from the end of the monomer remover was used, and that water was supplied immediately after the twin screw extruder type feeder, to obtain resin composition pellets. The conditions of the melt blending portion and the evaluation results of resin properties are shown in Tables 3 and 4, respectively.

Example 10

The same process as EXAMPLE 4 was repeated except that a continuous bulk polymerization apparatus comprising a complete mixing-type polymerization vessel of 2 m$^3$ having a condenser for evaporating and refluxing monomer vapor and helical ribbon wings, a single screw extruder type preheater, and a twin screw extruder type monomer remover of Ø90 mm having a barrel length of 4.2 m, and a twin screw extruder type feeder having a heater, tandemly connected to the barrel portion at a length of 0.35 m from the end of the monomer remover was used, and that water was supplied immediately after the twin screw extruder type feeder, to obtain resin composition pellets. The conditions of the melt blending portion and the evaluation results of resin properties are shown in Tables 3 and 4, respectively.

Example 11

The same operation as EXAMPLE 9 was repeated except that a part of the obtained resin composition pellets were collected, and supplied as recycled pellets from the twin screw extruder type feeder at the rate shown in Table 3 to obtain resin composition pellets. The average diameter of the pellets used as recycled pellets was 2.4 mm. The conditions of the melt blending portion and the evaluation results of resin properties are shown in Table 3 and 4, respectively.

Example 12

Continuous bulk polymerization was carried out by the same method as EXAMPLE 9, and the same operation as EXAMPLE 11 was repeated except that pellets of the copolymer (A) obtained without using the graft copolymer (B) and the stabilizers were used as recycled pellets to obtain resin composition pellets. The pellets used as the recycled pellets had an average particle diameter of 2.6 mm. The conditions of the melt blending portion and the evaluation results of resin properties are shown in Table 3 and 4, respectively.

EXAMPLES 1 to 12 indicate that the specified rubber-reinforced styrene transparent resin composition of the present invention has a physical property balance between transparency, color tone, impact resistance and stiffness, and excellent properties. EXAMPLES 5 to 8 indicate that the monomer composition, the ratio of the triple sequence of acrylonitrile monomer units, and the solubility parameter of the copolymer (A) satisfy the preferred specified ranges of the present invention, and thus particularly, the balance between chemical resistance and color tone is excellent. Furthermore, EXAMPLES 9 and 10 reveal that the conditions of melt blending of the copolymer (A) and the graft copolymer (B) satisfy the preferred specified ranges of the present invention, and thus particularly, the appearance and the balance between impact resistance, stiffness and color tone is excellent. EXAMPLES 11 and 12 also reveal that recycle pellets are used in the preferred specified condition ranges of the present invention, and thus particularly, the appearance and the physical property balance between impact resistance, stiffness, etc. is excellent.

However, the resin compositions obtained in COMPARATIVE EXAMPLES 1 and 2 comprise acetone soluble resin components having acid values beyond the specified range of the present invention, and thus have a poor physical property balance between transparency, color tone, impact resistance and stiffness, and poor physical properties. COMPARATIVE EXAMPLE 3 comprises the acetone soluble resin component containing a monomer composition out of the specified range of the present invention, and thus has poor color tone, impact resistance, transparency and appearance.

TABLE 1

Graft copolymer (B)

| Co-polymer No. | Rubber polymer | | | Composition of vinyl monomer (wt %) | | | Acid value of mixture (c) mgKOH/g | Re-fractive index | Reduced viscosity $\eta_{sp}/C$ (dl/g) | Graft ratio (wt %) | Emulsifier content (wt %) | Moisture percentage (wt %) |
|---|---|---|---|---|---|---|---|---|---|---|---|---|
| | Rubber type | Refractive index | Rubber content (wt %) | Styrene | Acrylonitrile | Methyl methacrylate | | | | | | |
| B-1 | PBD | 1.52 | 50 | 11.5 | 4.0 | 34.5 | 0.004 | 1.52 | 0.24 | 45 | 0.8 | 0.3 |
| B-2 | PBD | 1.52 | 45 | 12.6 | 4.4 | 38.0 | 0.004 | 1.52 | 0.32 | 51 | 0.6 | 0.3 |
| B-3 | PBD | 1.52 | 50 | 11.5 | 4.0 | 34.5 | 0.004 | 1.52 | 0.24 | 45 | 0.05 | 0.06 |
| B-4 | PBD | 1.52 | 50 | 10.0 | 10.0 | 30.0 | 0.004 | 1.52 | 0.35 | 51 | 0.6 | 0.3 |

Note)
PBD = polybutadiene latex

TABLE 2-1

Composition of resin composition

Copolymer (A)

| Example No. | Composition of vinyl monomer (wt %) | | | | Acid value of monomer mixture (a) (mgKOH/g) | Reduced viscosity | Refractive index | Solubility parameter (cal/ml)$^{1/2}$ | Feed rate kg/hr | Number of parts (parts) |
|---|---|---|---|---|---|---|---|---|---|---|
| | Styrene | Acrylonitrile | Methyl methacrylate | Methacrylic acid | | | | | | |
| 1 | 23.0 | 8.0 | 69.0 | — | 0.004 | 0.47 | 1.52 | — | 150 | 71.4 |
| 2 | 23.0 | 8.0 | 69.0 | — | 0.004 | 0.47 | 1.52 | — | 150 | 71.4 |
| 3 | 23.0 | 8.0 | 69.0 | — | 0.004 | 0.40 | 1.52 | — | — | 71.4 |
| 4 | 24.0 | 5.0 | 71.0 | — | 0.004 | 0.45 | 1.52 | 10.2 | 150 | 71.4 |
| 5 | 17.5 | 30.0 | 52.5 | — | 0.004 | 0.38 | 1.52 | 11.5 | 150 | 71.4 |
| 6 | 17.5 | 30.0 | 52.5 | — | 0.004 | 0.38 | 1.52 | 11.5 | 150 | 71.4 |
| 7 | 20.0 | 20.0 | 60.0 | — | 0.004 | 0.42 | 1.52 | 11.0 | 150 | 71.4 |
| 8 | 20.0 | 20.0 | 60.0 | — | 0.004 | 0.42 | 1.52 | 11.0 | — | 71.4 |
| 9 | 24.0 | 5.0 | 71.0 | — | 0.004 | 0.45 | 1.52 | 10.2 | 150 | 71.4 |
| 10 | 24.0 | 5.0 | 71.0 | — | 0.004 | 0.45 | 1.52 | 10.2 | 150 | 71.4 |
| 11 | 24.0 | 5.0 | 71.0 | — | 0.004 | 0.45 | 1.52 | 10.2 | 150 | 71.4 |
| 12 | 24.0 | 5.0 | 71.0 | — | 0.004 | 0.45 | 1.52 | 10.2 | 150 | 71.4 |
| Comp. Example 1 | 23.0 | 8.0 | 69.0 | — | 0.004 | 0.47 | 1.52 | — | 150 | 71.4 |
| Comp. Example 2 | 23.0 | 8.0 | 66.0 | 3.0 | 1.92 | 0.45 | 1.52 | — | 150 | 71.4 |
| Comp. Example 3 | 10.0 | 60.0 | 30.0 | — | 0.004 | 0.42 | 1.52 | 12.7 | 150 | 71.4 |

TABLE 2-2

| Example No. | Graft copolymer (B) | | | Blending method | Amount of water added (wt %) |
|---|---|---|---|---|---|
| | Type | Feed rate (kg/hr) | Number of parts (parts) | | |
| Example 1 | B-1 | 60 | 28.6 | Immediately after monomer removal from copolymer (A) | 0.95 |
| Example 2 | B-2 | 60 | 28.6 | Same as above | 0.95 |

TABLE 2-2-continued

| Example No. | Graft copolymer (B) Type | Feed rate (kg/hr) | Number of parts (parts) | Blending method | Amount of water added (wt %) |
|---|---|---|---|---|---|
| Example 3 | B-1 | — | 28.6 | Dry blending | 1 |
| Example 4 | B-1 | 60 | 28.6 | Immediately after monomer removal from copolymer (A) | 0.95 |
| Example 5 | B-1 | 60 | 28.6 | Same as above | 0.95 |
| Example 6 | B-4 | 60 | 28.6 | Same as above | 0.95 |
| Example 7 | B-1 | 60 | 28.6 | Same as above | 0.95 |
| Example 8 | B-1 | — | 28.6 | Dry Blending | 1 |
| Example 9 | B-1 | 60 | 28.6 | Immediately after monomer removal from copolymer (A) | 0.95 |
| Example 10 | B-1 | 60 | 28.6 | Same as above | 0.95 |
| Example 11 | B-1 | 60 | 28.6 | Same as above | 0.95 |
| Example 12 | B-1 | 60 | 28.6 | Same as above | 0.95 |
| Comp. Example 1 | B-3 | 60 | 28.6 | Immediately after monomer removal from copolymer (A) | — |
| Comp. Example 2 | B-1 | 60 | 28.6 | Same as above | 0.95 |
| Comp. Example 3 | B-1 | 60 | 28.6 | Same as above | 0.95 |

TABLE 3

Blending conditions

| | Conditions of melt blending portion | | | | Pellet recycle condition |
|---|---|---|---|---|---|
| | Actual volume in apparatus $V \times 10^3$ (m$^3$) | Moving velocity of discharged resin v (kg/h) | Value of Equation (1) of blending condition $V/v \times 10^6$ | Temperature (° C.) | Amount of recycled pellets (kg/h) |
| Examples 1, 2, and 4 to 7 | 3.0 | 210 | 14.3 | 240 | 0 |
| Examples 3 and 8 | 9.0 | 210 | 43.1 | 240 | 0 |
| Example 9 | 1.5 | 210 | 7.2 | 240 | 0 |
| Example 10 | 0.8 | 210 | 3.6 | 240 | 0 |
| Example 11 | 1.5 | 220 | 6.9 | 240 | 10 |
| Example 12 | 1.5 | 215 | 7.0 | 240 | 5 |
| Comparative Examples 1 to 3 | 3.0 | 210 | 14.3 | 240 | 0 |

TABLE 4-1

Resin properties

Acetone soluble resin component

| Example No. | Composition of vinyl monomer (wt %) | | | | Ratio of AN triple sequence (%) | Acid value (mgKOH/g) | Ratio (%) of component in the range of 0.75 to 1.2 times as large as average value of ($\phi_{ST}/\phi_{MMA}$) | Refractive index |
|---|---|---|---|---|---|---|---|---|
| | Styrene | Methyl methacrylate | Methacrylic acid | Actylonitrile | | | | |
| 1 | 23 | 69 | <1 | 8 | <1 | 0.032 | 97 | 1.52 |
| 2 | 23 | 69 | <1 | 8 | <1 | 0.045 | 96 | 1.52 |
| 3 | 23 | 69 | <1 | 8 | <1 | 0.026 | 61 | 1.52 |
| 4 | 24 | 71 | <1 | 5 | <1 | 0.041 | 98 | 1.52 |
| 5 | 18 | 52 | <1 | 30 | 2 | 0.030 | 97 | 1.52 |
| 6 | 18 | 52 | <1 | 30 | 2 | 0.034 | 97 | 1.52 |
| 7 | 20 | 60 | <1 | 20 | 2 | 0.042 | 96 | 1.52 |
| 8 | 20 | 60 | <1 | 20 | 2 | 0.023 | 96 | 1.52 |
| 9 | 24 | 71 | <1 | 5 | <1 | 0.039 | 98 | 1.52 |
| 10 | 24 | 71 | <1 | 5 | <1 | 0.034 | 98 | 1.52 |
| 11 | 24 | 71 | <1 | 5 | <1 | 0.036 | 98 | 1.52 |
| 12 | 24 | 71 | <1 | 5 | <1 | 0.034 | 98 | 1.52 |
| Comp. Example 1 | 23 | 69 | <1 | 8 | <1 | 0.004 | 98 | 1.52 |

TABLE 4-1-continued

Resin properties

Acetone soluble resin component

| Example No. | Composition of vinyl monomer (wt %) | | | | Ratio of AN triple sequence (%) | Acid value (mgKOH/g) | Ratio (%) of component in the range of 0.75 to 1.2 times as large as average value of ($\phi_{ST}/\phi_{MMA}$) | Refractive index |
|---|---|---|---|---|---|---|---|---|
| | Styrene | Methyl meth-acrylate | Meth-acrylic acid | Actylo-nitrile | | | | |
| Comp. Example 2 | 23 | 66 | 3 | 8 | <1 | 2.03 | 97 | 1.52 |
| Comp. Example 3 | 10 | 30 | <1 | 60 | 15 | 0.022 | 97 | 1.52 |

TABLE 4-2

Resin properties

Properties of resin composition

| Example No. | Total light trans-mittance (%) | Haze (%) | Pellet Y1 | Izod impact strength (J/m) | Tensile strength (MPa) | Chemical resistance | | | Appearance |
|---|---|---|---|---|---|---|---|---|---|
| | | | | | | Ethanol | Isopropanol | Liquid detergent "Top" | |
| 1 | 84 | 7 | 10 | 160 | 45 | — | — | — | ○ |
| 2 | 85 | 7 | 12 | 145 | 47 | — | — | — | ○ |
| 3 | 80 | 10 | 17 | 150 | 45 | — | — | — | ○ |
| 4 | 84 | 7 | 11 | 155 | 45 | Δ | x | Δ | ○ |
| 5 | 82 | 8 | 15 | 155 | 43 | ○ | ○ | ⊚ | ○ |
| 6 | 83 | 7 | 16 | 165 | 46 | ○ | ○ | ⊚ | ○ |
| 7 | 83 | 7 | 12 | 150 | 45 | ○ | ○ | ⊚ | ○ |
| 8 | 80 | 9 | 21 | 135 | 41 | ○ | ○ | ⊚ | ○ |
| 9 | 85 | 6 | 8 | 180 | 46 | — | — | — | ○ |
| 10 | 84 | 7 | 7 | 130 | 43 | — | — | — | Δ |
| 11 | 85 | 6 | 7 | 200 | 46 | — | — | — | ⊚ |
| 12 | 85 | 6 | 6 | 195 | 46 | — | — | — | ⊚ |
| Comp. Example 1 | 83 | 7 | 11 | 100 | 38 | — | — | — | ○ |
| Comp. Example 2 | 75 | 13 | 26 | 140 | 46 | — | — | — | ○ |
| Comp. Example 3 | 74 | 13 | 48 | 30 | 46 | ○ | Δ | ⊚ | x |

What is claimed is:

1. A method of producing a rubber-reinforced styrene transparent resin composition, which is a styrene copolymer reinforced with a rubber polymer, and has an acetone soluble resin component having a monomer composition comprising 5 to 70% by weight of aromatic vinyl monomer, 30 to 95% by weight of unsaturated carboxylic acid alkyl ester monomer, 0 to 50% by weight of vinyl cyanide monomer, and 0 to 50% by weight of another monomer copolymerizable with these monomers, the acid value of the acetone soluble resin component being 0.01 to 1 mgKOH/g, the method comprising:

continuously bulk polymerizing or continuously solution polymerizing a vinyl monomer mixture (a) to obtain a copolymer (A);

removing residual monomer from the copolymer (A) following the continuous bulk polymerization or the continuous solution polymerization of the vinyl monomer mixture (a);

during or after the step of removing the residual monomer from the copolymer (A), adding 90 to 5 parts by weight of a graft copolymer (B) to 10 to 95 parts by weight of a copolymer (A) in a melt state and melt-blending the graft copolymer (B) and copolymer (A), said graft copolymer (B) being obtained by graft-polymerizing a vinyl monomer mixture (c) in the presence of a rubber polymer (b) and having a moisture content of 0.1% or more by weight and less than 5% by weight, the vinyl monomer mixtures (a) and (c) each being independently a monomer mixture comprising 5 to 70% by weight of (a1) aromatic vinyl monomer, 30 to 95% by weight of (a2) unsaturated carboxylic acid alkyl ester monomer, 0 to 50% by weight of (a3) vinyl cyanide monomer, and 0 to 50% by weight of (a4) another monomer copolymerizable with these monomers, and containing (a5) substantially no unsaturated carboxylic acid monomer other than the unsaturated carboxylic acid alkyl ester monomer (a2), and the graft copolymer (B) containing 0.1 to 5% by weight of an emulsifier.

2. A method of producing a rubber-reinforced styrene transparent resin composition according to claim 1, wherein the graft copolymer (B) is added to the copolymer (A) when an amount of the residual monomer in the copolymer (A) is 10% by weight or less.

3. A method of producing a rubber-reinforced styrene transparent resin composition according to claim 2, wherein assuming that the actual volume of a melt-blending portion of an apparatus, in which the copolymer (A) and the graft copolymer (B) are melt-blended, is V (m³), the temperature is T (° C.), and the moving velocity of the resin composition finally discharged is v (kg/h), the following conditions ① and ② are satisfied:

$$4.60 \times 10^{-6} (m^3 \cdot h/kg) \leq V/v \leq 11.50 \times 10^{-6} (m^3 \cdot h/kg) \quad ①$$

$$T \geq 230 \; (° C.) \quad ②.$$

4. A method of producing a rubber-reinforced styrene transparent resin composition according to claim 1, wherein the graft copolymer (B) added to the copolymer (A) is in a semi-melt or melt state.

5. A method of producing a rubber-reinforced styrene transparent resin composition according to claim 4, wherein the temperature of the graft copolymer (B) added to the copolymer (A) is 100 to 220° C.

6. A method of producing a rubber-reinforced styrene transparent resin composition, comprising:

continuously bulk polymerizing or continuously solution polymerizing a vinyl monomer mixture (a) to obtain a copolymer (A);

removing residual monomer from the copolymer (A) following the continuous bulk polymerization or the continuous solution polymerization of the vinyl monomer mixture (a);

during or after the step of removing the residual monomer from the copolymer (A), adding 90 to 5 parts by weight of a graft copolymer (B) to 10 to 95 parts by weight of a copolymer (A) in a melt state and melt-blending the graft copolymer (B) and copolymer (A), said craft copolymer (B) being obtained by graft-polymerizing a vinyl monomer mixture (c) in the presence of a rubber polymer (b) and having a moisture content of 0.1% or more by weight and less than 5% by weight, the vinyl monomer mixtures (a) and (c) each being independently a monomer mixture comprising 5 to 70% by weight of (a1) aromatic vinyl monomer, 30 to 95% by weight of (a2) unsaturated carboxylic acid alkyl ester monomer, 0 to 50% by weight of (a3) vinyl cyanide monomer, and 0 to 50% by weight of (a4) another monomer copolymerizable with these monomers, and containing (a5) substantially no unsaturated carboxylic acid monomer other than the unsaturated carboxylic acid alkyl ester monomer (a2), and the graft copolymer (B) containing 0.1 to 30% by weight of a pelletized thermoplastic resin (C) added and mixed therewith in a melt or semi-melt state, and which comprises the copolymer A.

7. A method of producing a rubber-reinforced styrene transparent resin composition according to claim 6, wherein the pelletized thermoplastic resin (C) has an average particle diameter of 1 to 10 mm.

8. A method of producing a rubber-reinforced styrene transparent resin composition, which is a styrene copolymer reinforced with a rubber polymer, and has an acetone soluble resin component having a monomer composition comprising 5 to 70% by weight of aromatic vinyl monomer, 30 to 95% by weight of unsaturated carboxylic acid alkyl ester monomer, 0 to 50% by weight of vinyl cyanide monomer, and 0 to 50% by weight of another monomer copolymerizable with these monomers, the acid value of the acetone soluble resin component being 0.01 to 1 mgKOH/g, the method comprising:

continuously bulk polymerizing or continuously solution polymerizing a vinyl monomer mixture (a) to obtain a copolymer (A);

removing residual monomer from the copolymer (A) following the continuous bulk polymerization or the continuous solution polymerization of the vinyl monomer mixture (a);

during or after the step of removing the residual monomer from the copolymer (A), adding 90 to 5 parts by weight of a graft copolymer (B) to 10 to 95 parts by weight of a copolymer (A) in a melt state and melt-blending the graft copolymer (B) and copolymer (A), said graft copolymer (B) being obtained by graft-polymerizing a vinyl monomer mixture (c) in the presence of a rubber polymer (b) and having a moisture content of 0.1% or more by weight and less than 5% by weight, the vinyl monomer mixtures (a) and (c) each being independently a monomer mixture comprising 5 to 70% by weight of (a1) aromatic vinyl monomer, 30 to 95% by weight of (a2) unsaturated carboxylic acid alkyl ester monomer, 0 to 50% by weight of (a3) vinyl cyanide monomer, and 0 to 50% by weight of (a4) another monomer copolymerizable with these monomers, and the graft copolymer (B) containing 0.1 to 5% by weight of an emulsifier.

9. A method of producing a rubber-reinforced styrene transparent resin composition according to claim 8, wherein the graft copolymer (B) is added to the copolymer (A) when an amount of the residual monomer in the copolymer (A) is 10% by weight or less.

10. A method of producing a rubber-reinforced styrene transparent resin composition according to claim 9, wherein assuming that the actual volume of a melt-blending portion of an apparatus, in which the copolymer (A) and the graft copolymer (B) are melt-blended, is V (m³), the temperature is T (° C.), and the moving velocity of the resin composition finally discharged is v (kg/h), the following conditions ① and ② are satisfied:

$$4.60 \times 10^{-6} (m^3 \cdot h/kg) \leq V/v \leq 11.50 \times 10^{-6} (m^3 \cdot h/kg) \quad ①$$

$$T \geq 230 (° C.) \quad ②.$$

11. A method of producing a rubber-reinforced styrene transparent resin composition according to claim 1 or claim 8, wherein 0.1 to 5% by weight of water relative to the resin composition is added in the course of the melt-blending of the copolymer (A) and the graft copolymer (B).

12. A method of producing a rubber-reinforced styrene transparent resin composition according to claim 9 or claim 10, wherein the graft copolymer (B) added to the copolymer (A) is in a semi-melt or melt state.

13. A method of producing a rubber-reinforced styrene transparent resin composition, comprising:

continuously bulk polymerizing or continuously solution polymerizing a vinyl monomer mixture (a) to obtain a copolymer (A);

removing residual monomer from the copolymer (A) following the continuous bulk polymerization or the continuous solution polymerization of the vinyl monomer mixture (a)

during or after the step of removing the residual monomer from the copolymer (A), adding 90 to 5 parts by weight of a graft copolymer (B) to 10 to 95 parts by weight of a copolymer (A) in a melt state and melt-blending the graft copolymer (B) and copolymer (A), said graft copolymer (B) being obtained by graft-polymerizing a vinyl monomer mixture (c) in the presence of a rubber polymer (b) and having a moisture content of 0.1% or more by weight and less than 5% by weight, the vinyl monomer mixtures (a) and (c) each being independently a monomer mixture comprising 5 to 70% by weight of (a1) aromatic vinyl monomer, 30 to 95% by weight of (a2) unsaturated carboxylic acid alkyl ester monomer, 0 to 50% by weight of (a3) vinyl cyanide monomer, and 0 to 50% by weight of (a4) another monomer copolymerizable with these monomers, and the graft copolymer (B) containing 0.1 to 30% by weight of a pelletized thermoplastic resin (C) added and mixed therewith in a melt or semi-melt state, and which comprises the copolymer A.

* * * * *